US009661659B2

(12) United States Patent
Choi et al.

(10) Patent No.: US 9,661,659 B2
(45) Date of Patent: May 23, 2017

(54) METHOD AND APPARATUS FOR RECEIVING SIGNAL BY STATION IN WIRELESS LAN SYSTEM

(71) Applicant: LG ELECTRONICS INC., Seoul (KR)

(72) Inventors: Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 14/766,422

(22) PCT Filed: Mar. 6, 2014

(86) PCT No.: PCT/KR2014/001847
§ 371 (c)(1),
(2) Date: Aug. 6, 2015

(87) PCT Pub. No.: WO2014/137172
PCT Pub. Date: Sep. 12, 2014

(65) Prior Publication Data
US 2015/0365973 A1 Dec. 17, 2015

Related U.S. Application Data

(60) Provisional application No. 61/773,825, filed on Mar. 7, 2013, provisional application No. 61/780,912, filed on Mar. 13, 2013.

(51) Int. Cl.
*H04W 74/08* (2009.01)
*H04W 74/00* (2009.01)
*H04W 84/12* (2009.01)

(52) U.S. Cl.
CPC ..... *H04W 74/0816* (2013.01); *H04W 74/006* (2013.01); *H04W 74/0891* (2013.01); *H04W 84/12* (2013.01)

(58) Field of Classification Search
CPC .............................. H04L 5/003; H04W 72/04
See application file for complete search history.

(56) References Cited

U.S. PATENT DOCUMENTS

2007/0133489 A1 6/2007 Ramesh et al.
2011/0103352 A1 5/2011 Wentink
(Continued)

FOREIGN PATENT DOCUMENTS

JP 2009-010509 1/2009
JP 2010-056653 3/2010
(Continued)

OTHER PUBLICATIONS

PCT International Application No. PCT/KR2014/001847, Written Opinion of the International Searching Authority dated Jun. 26, 2014, 13 pages.
(Continued)

*Primary Examiner* — Andrew Lai
*Assistant Examiner* — Zhiren Qin
(74) *Attorney, Agent, or Firm* — Lee, Hong, Degerman, Kang & Waimey PC

(57) ABSTRACT

Disclosed is a method for transmitting and receiving a signal by a station (STA) in a wireless LAN system, the method comprising the steps of: performing clear channel assessment (CCA); when electric power equal to or larger than a predetermined level is detected as a result of the CCA, transmitting, to an AP, a request relating to configuration of an interval; and receiving interval information as a response to the request, wherein when the electric power equal to or larger than the predetermined level has resulted from uplink transmission, the received interval information is information synchronized with interval information of a basic service set (BSS) relating to the uplink transmission.

12 Claims, 16 Drawing Sheets

(56) References Cited

U.S. PATENT DOCUMENTS

| | | | |
|---|---|---|---|
| 2011/0305236 A1 | 12/2011 | Morioka | |
| 2012/0044893 A1* | 2/2012 | Suzuki | H04W 72/0413 |
| | | | 370/329 |
| 2012/0155294 A1 | 6/2012 | Park | |
| 2012/0218983 A1 | 8/2012 | Noh et al. | |
| 2012/0243454 A1* | 9/2012 | Hwang | H04W 52/0229 |
| | | | 370/311 |
| 2012/0314673 A1 | 12/2012 | Noh et al. | |
| 2015/0223241 A1* | 8/2015 | Cattoni | H04L 5/0044 |
| | | | 370/329 |

FOREIGN PATENT DOCUMENTS

| | | |
|---|---|---|
| JP | 2010-098339 | 4/2010 |
| JP | 2014520449 | 8/2014 |
| WO | 2011/074761 | 6/2011 |
| WO | 2014/110397 | 7/2014 |

OTHER PUBLICATIONS

Nokia, "Restricted Access Window Signaling for Uplink Channel Access", doc.: IEEE 80211-1210843r0, XP068039376, Jul. 2012, 13 pages.

European Patent Office Application Serial No. 14760111.6, Search Report dated Sep. 8, 2016, 9 pages.

PCT International Application No. PCT/KR2014/001847, Written Opinion of the International Searching Authority dated Jun. 26, 2014, 11 pages.

\* cited by examiner

FIG. 15
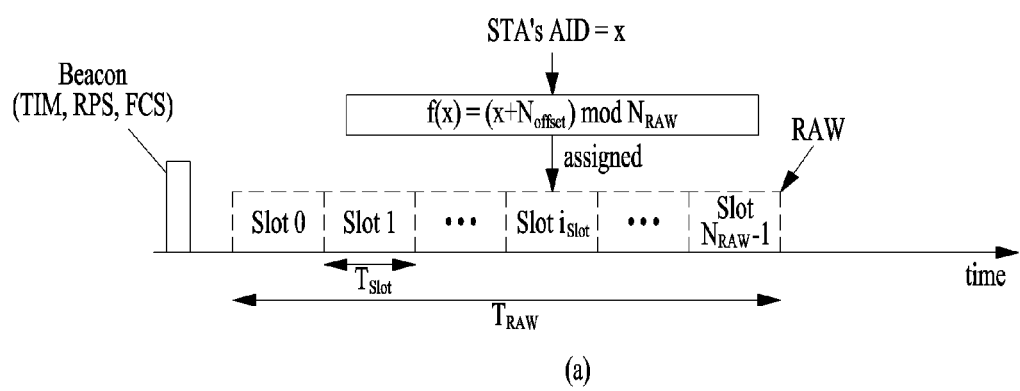
(a)
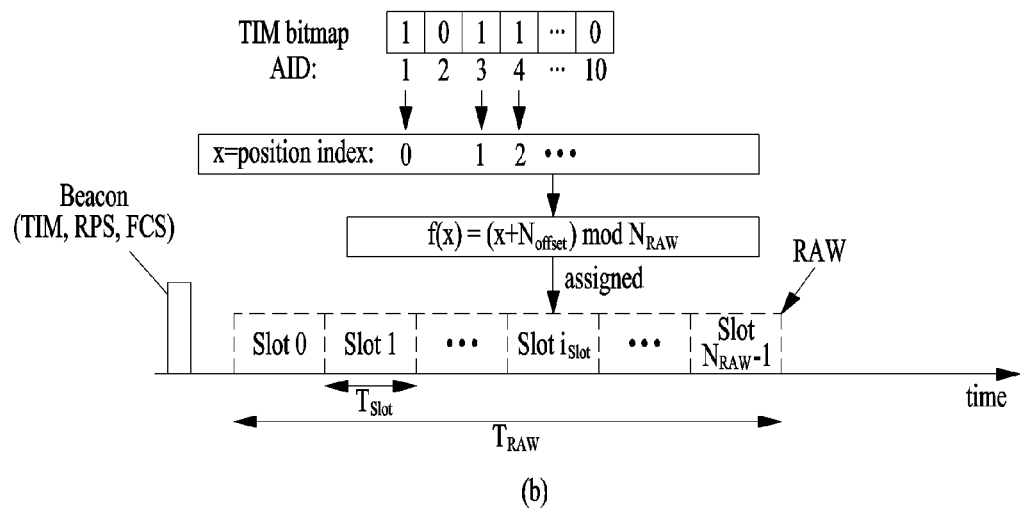
(b)

FIG. 16
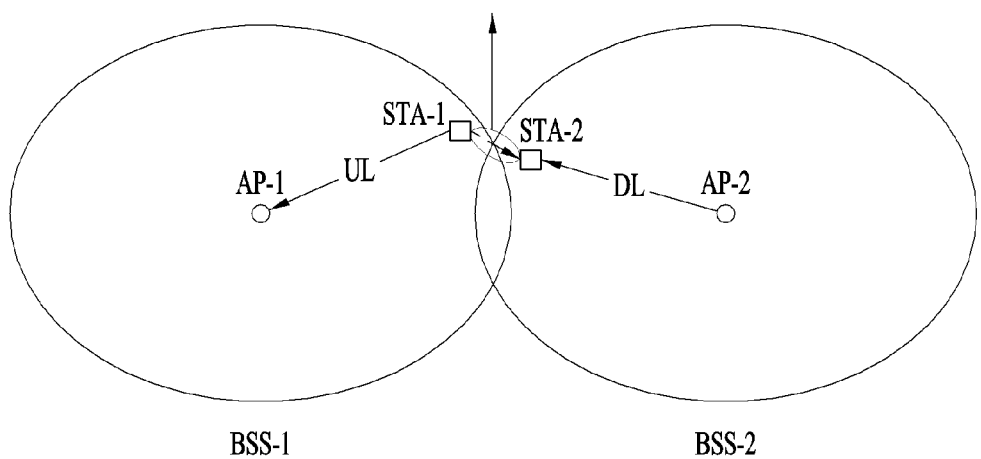
FIG. 17
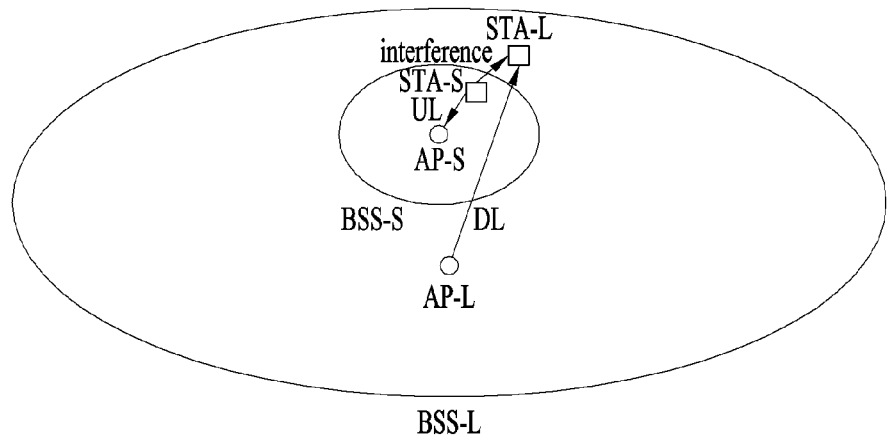
(a)
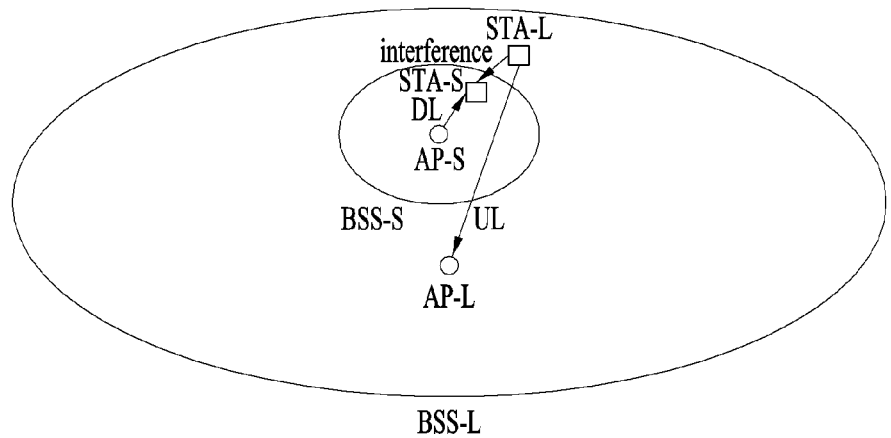
(b)

FIG. 19
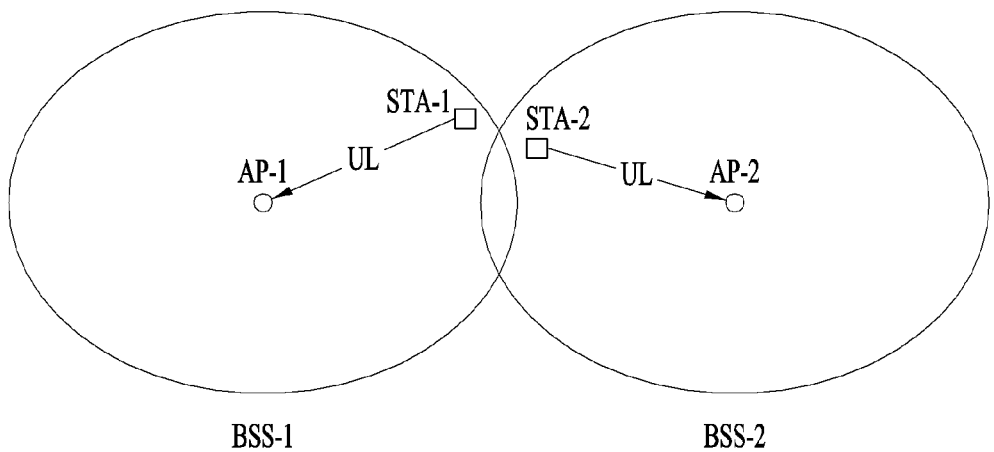
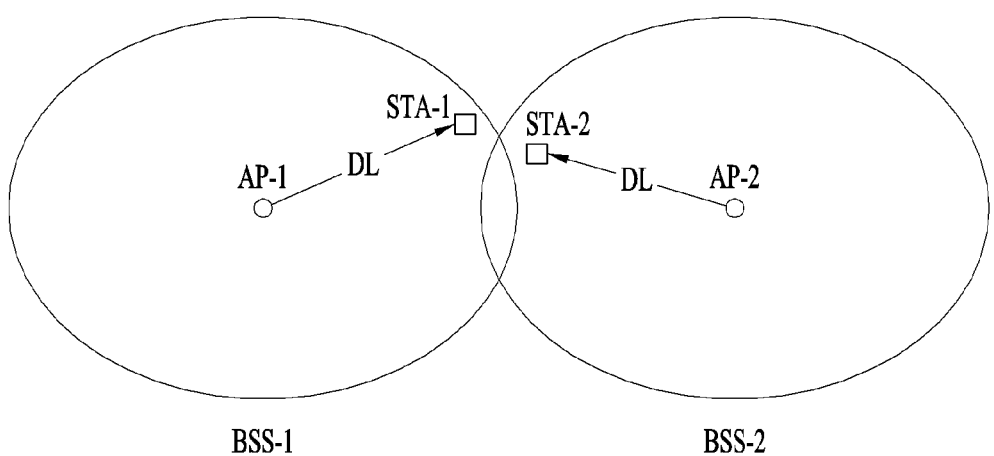
FIG. 20
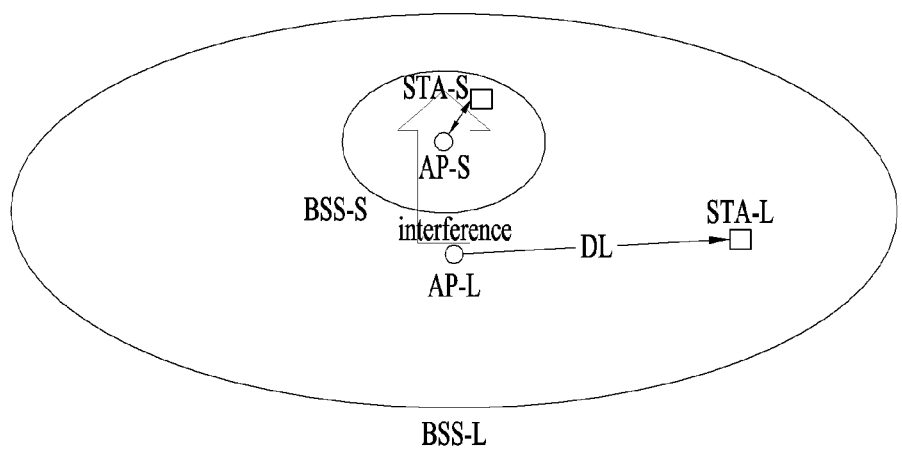

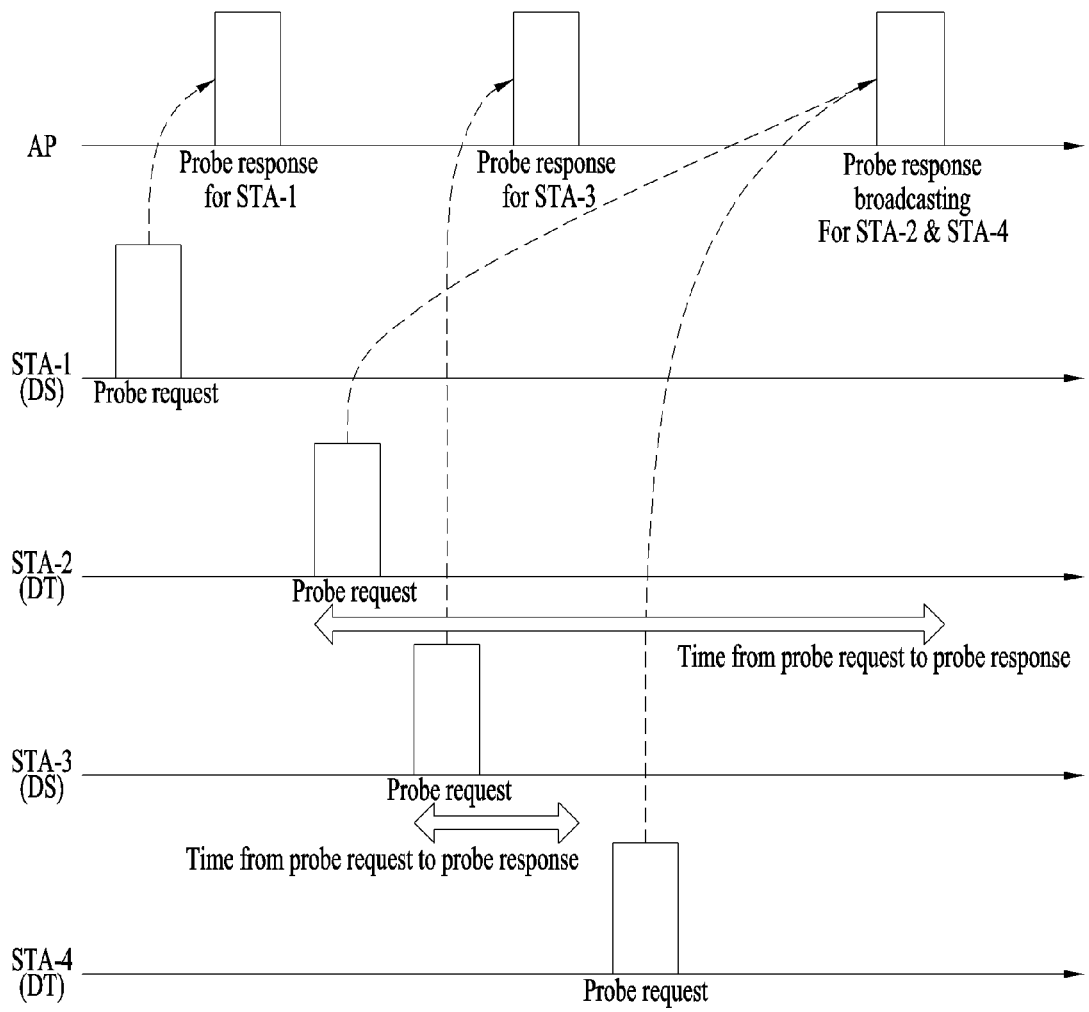

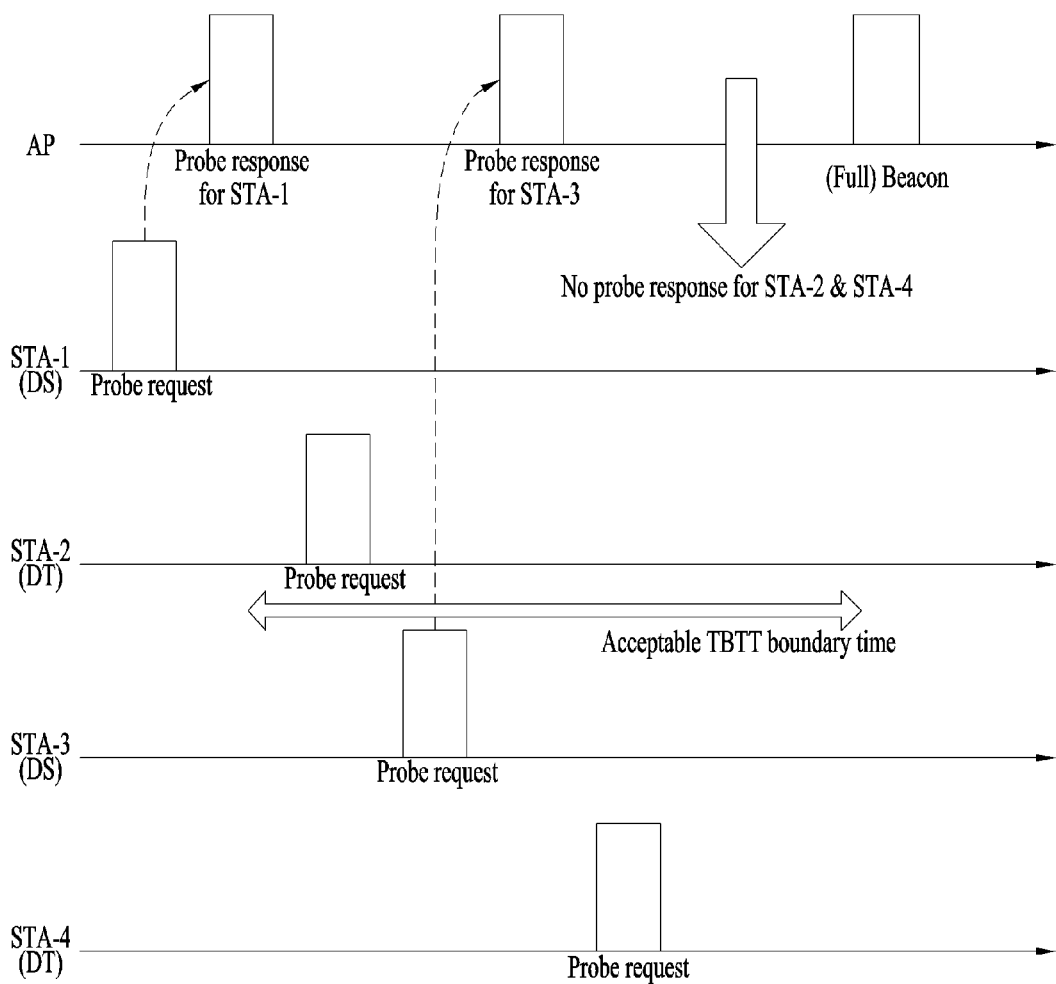

METHOD AND APPARATUS FOR RECEIVING SIGNAL BY STATION IN WIRELESS LAN SYSTEM

CROSS-REFERENCE TO RELATED APPLICATIONS

This application is the National Stage filing under 35 U.S.C. 371 of International Application No. PCT/KR2014/001847, filed on Mar. 6, 2014, which claims the benefit of U.S. Provisional Application No. 61/773,825, filed on Mar. 7, 2013 and 61/780,912, filed on Mar. 13, 2013, the contents of which are all hereby incorporated by reference herein in their entirety.

TECHNICAL FIELD

The following description relates to a wireless communication system and, more specifically, to a method and apparatus for transmitting and receiving signals in a wireless LAN system.

BACKGROUND ART

With the growth of information communication technology, various wireless communication technologies are under development. Among the wireless communication technologies, wireless local area network (WLAN) technology enables wireless Internet access at home or in offices or specific service provision areas using a mobile terminal such as a personal digital assistant (PDA), laptop computer, portable multimedia player (PMP) or the like on the basis of radio frequency technology.

To overcome the limitations of communication rate, which have been cited as a weak point of WLAN, recent technical standards have introduced systems with increased network rate and reliability and extended wireless network coverage. For example, IEEE 802.11n supports high throughput (HT) of a data rate of 540 Mbps or higher and introduces MIMO (Multiple Input Multiple Output) technology which uses multiple antennas for both a transmitter and a receiver in order to minimize a transmission error and optimize a data rate.

M2M (Machine-to-Machine) communication technology is under discussion as a next-generation communication technology. In IEEE 802.11 WLAN system, IEEE 802.11ah is developed as a technical standard for supporting M2M communication. For M2M communication, a scenario in which a small amount of data is transmitted/received at a low speed occasionally in an environment having a considerably large number of devices can be considered.

Communication in a WLAN system is performed through a medium shared by all devices. When the number of devices increases as in M2M communication, it is necessary to improve a channel access mechanism more efficiently in order to reduce unnecessary power consumption and generation of interference.

DISCLOSURE

Technical Problem

An object of the present invention devised to solve the problem lies in a method and apparatus for transmitting and receiving signals for reducing interference applied by a station to a station of another basic service set.

The technical problems solved by the present invention are not limited to the above technical problems and those skilled in the art may understand other technical problems from the following description.

Technical Solution

In a first technical aspect of the present invention, a method for performing transmission and reception by a station (STA) in a wireless LAN system includes: performing clear channel assessment (CCA); when power equal to or higher than a predetermined level is detected as a result of the CCA, transmitting, to an AP, a request relating to configuration of an interval; and receiving interval information as a response to the request, wherein, when the power equal to or higher than the predetermined level has resulted from uplink transmission, the received interval information is information synchronized with interval information of a basic service set (BSS) relating to the uplink transmission.

In a second technical aspect of the present invention, an STA in a wireless LAN system includes: a transceiver module; and a processor, wherein the processor is configured to perform CCA, to transmit a request relating to configuration of an interval to an AP when power equal to or higher than a predetermined level is detected as a result of the CCA and to receive interval information as a response to the request, wherein, when the power equal to or higher than the predetermined level has resulted from uplink transmission, the received interval information is information synchronized with interval information of a BSS relating to the uplink transmission.

When the power equal to or higher than the predetermined level has resulted from downlink transmission, channel access of the STA may be prohibited in the interval corresponding to the received interval information.

A link direction of the received interval information may be the same as a link direction of the interval information of the BSS relating to the uplink transmission.

The received interval information may relate to a restricted access window (RAW).

The STA may perform transmission or reception in a slot corresponding to an association identifier (AID) thereof in a link direction corresponding to a RAW including the slot.

The interval information may be transmitted through a beacon frame.

The received interval information may be a transmission opportunity (TXOP) time duration.

The STA may perform transmission or reception in the TXOP time duration in a link direction set in the TXOP time duration.

When TXOP truncation is applied to the TXOP time duration, information about the TXOP truncation may be transmitted to an AP of the BSS relating to the uplink transmission.

When a BSS to which the STA belongs includes the coverage of the AP of the BSS relating to the uplink transmission, the STA may be located outside the coverage of the AP of the BSS relating to the uplink transmission.

The method may further include receiving a ready to send (RTS) frame transmitted from an STA relating to the uplink transmission, wherein, when the STA does not receive a clear to send (CTS) frame within a predetermined time after receiving the RTS frame, the STA is determined to be located outside the coverage of the AP of the BSS relating to the uplink transmission.

The request relating to configuration of an interval may include a request for a beam pattern different from a beam pattern used in the BSS relating to the uplink transmission.

The method may further include transmitting a probe request frame to the AP, wherein the probe request frame includes an indication indicating whether a direct probe response to the probe request frame is received.

The indication may be determined on the basis of whether the STA is a delay-tolerant (DT) STA or a delay-sensitive (DS) STA.

Advantageous Effects

According to embodiments of the present invention, it is possible to reduce interference caused by signal transmission and reception in a basic service set and applied to another service set. In addition, it is possible to increase a degree of freedom in the arrangement/operation of basic service sets by reducing the influence of interference.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIGS. 14 and 15 are views referred to for describing a RAW;

FIGS. 16 and 17 illustrate interference situations to which an embodiment of the present invention is applicable;

FIGS. 18 to 23 are views referred to for describing embodiments of the present invention.

BEST MODE

Figure 1:
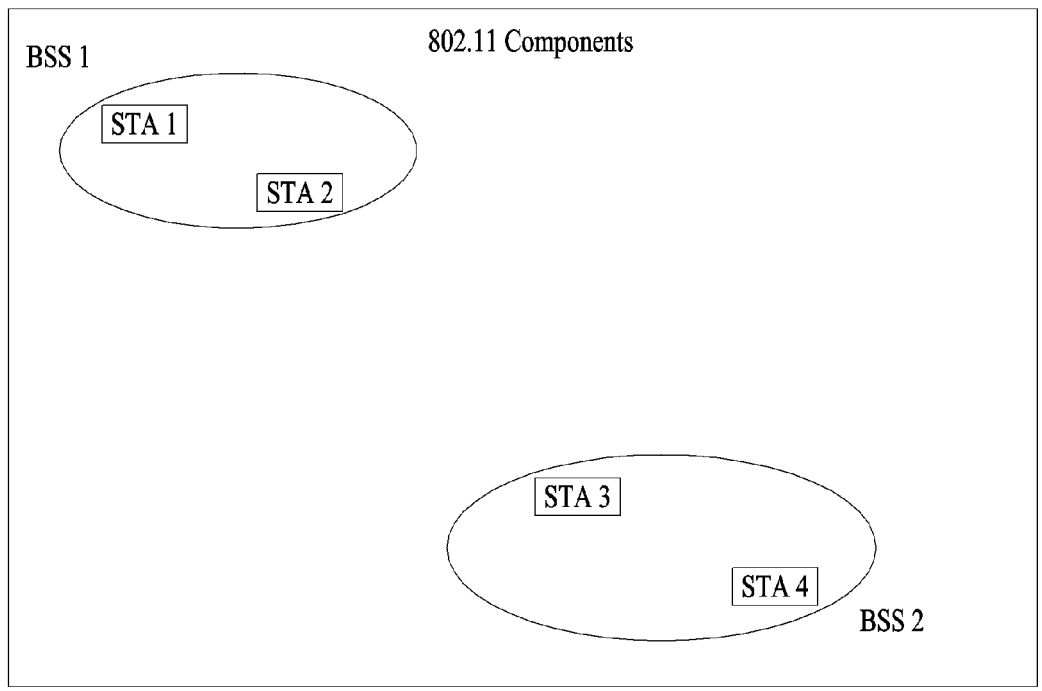
FIG. 1 illustrates an exemplary configuration of an IEEE 802.11 system to which the present invention is applicable.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention. Like reference numerals denote the same components throughout the specification.

The embodiments of the present invention may be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
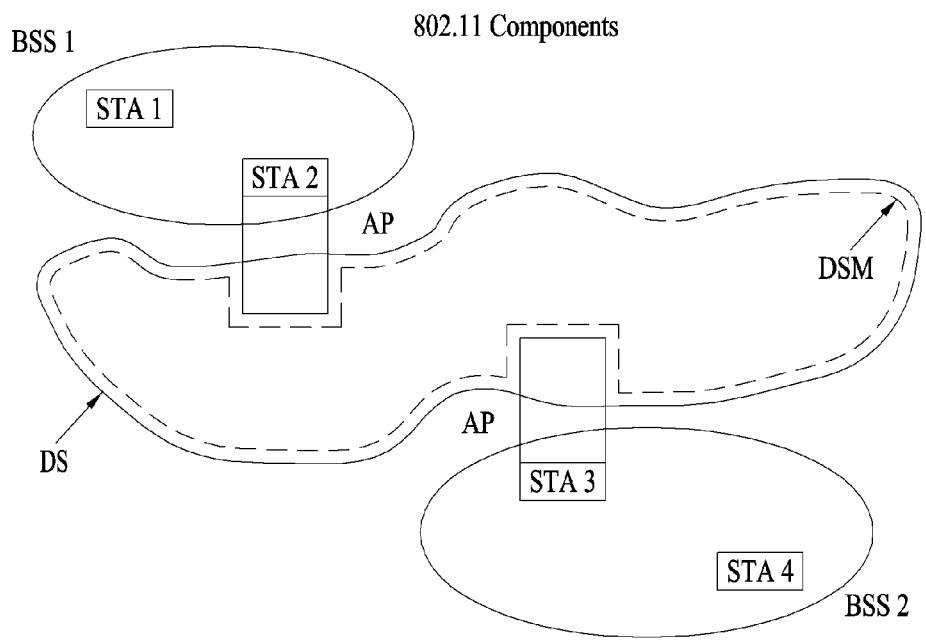
FIG. 2 illustrates another exemplary configuration of the IEEE 802.11 system to which the present invention is applicable.

FIG. 2 illustrates another exemplary configuration of the IEEE 802.11 system to which the present invention is applicable. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An AP is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Figure 3:
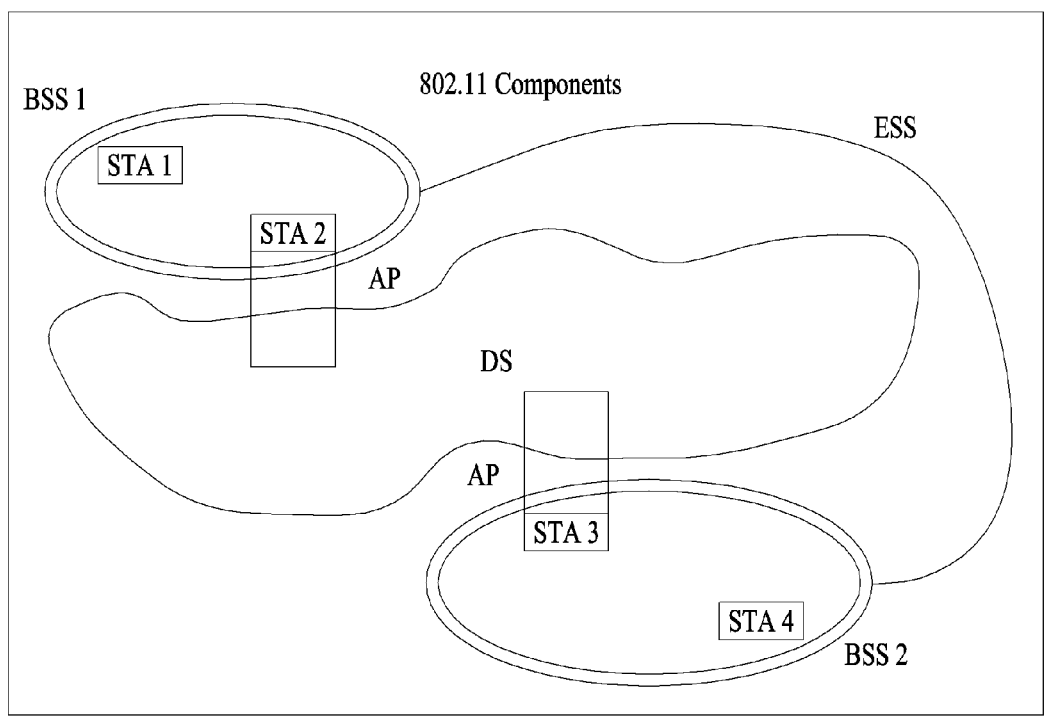
FIG. 3 illustrates another exemplary configuration of the IEEE 802.11 system to which the present invention is applicable.

FIG. 3 illustrates another exemplary configuration of the IEEE 802.11 system to which the present invention is applicable. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
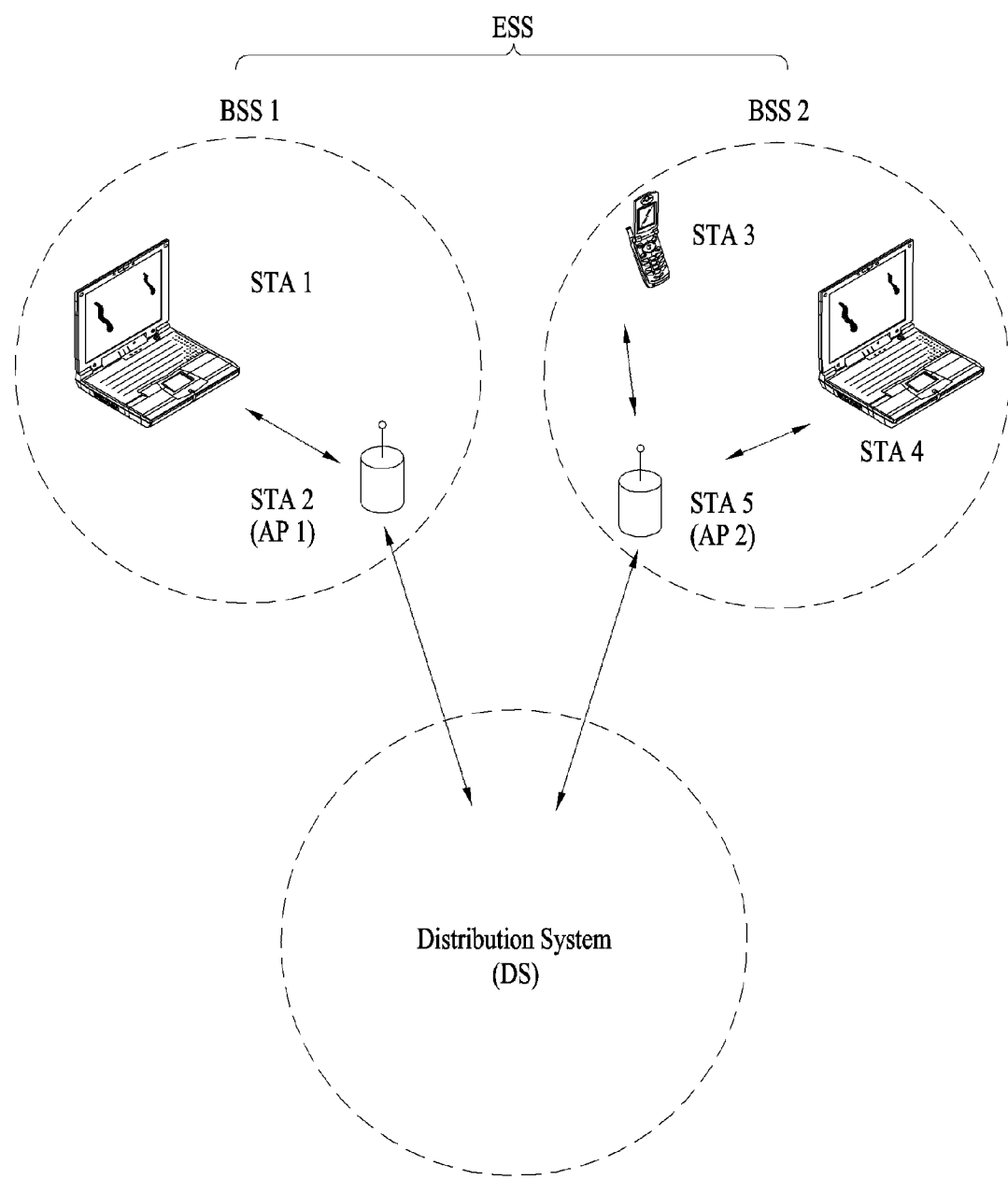
FIG. 4 illustrates an exemplary configuration of a WLAN system.

FIG. 4 illustrates an exemplary configuration of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
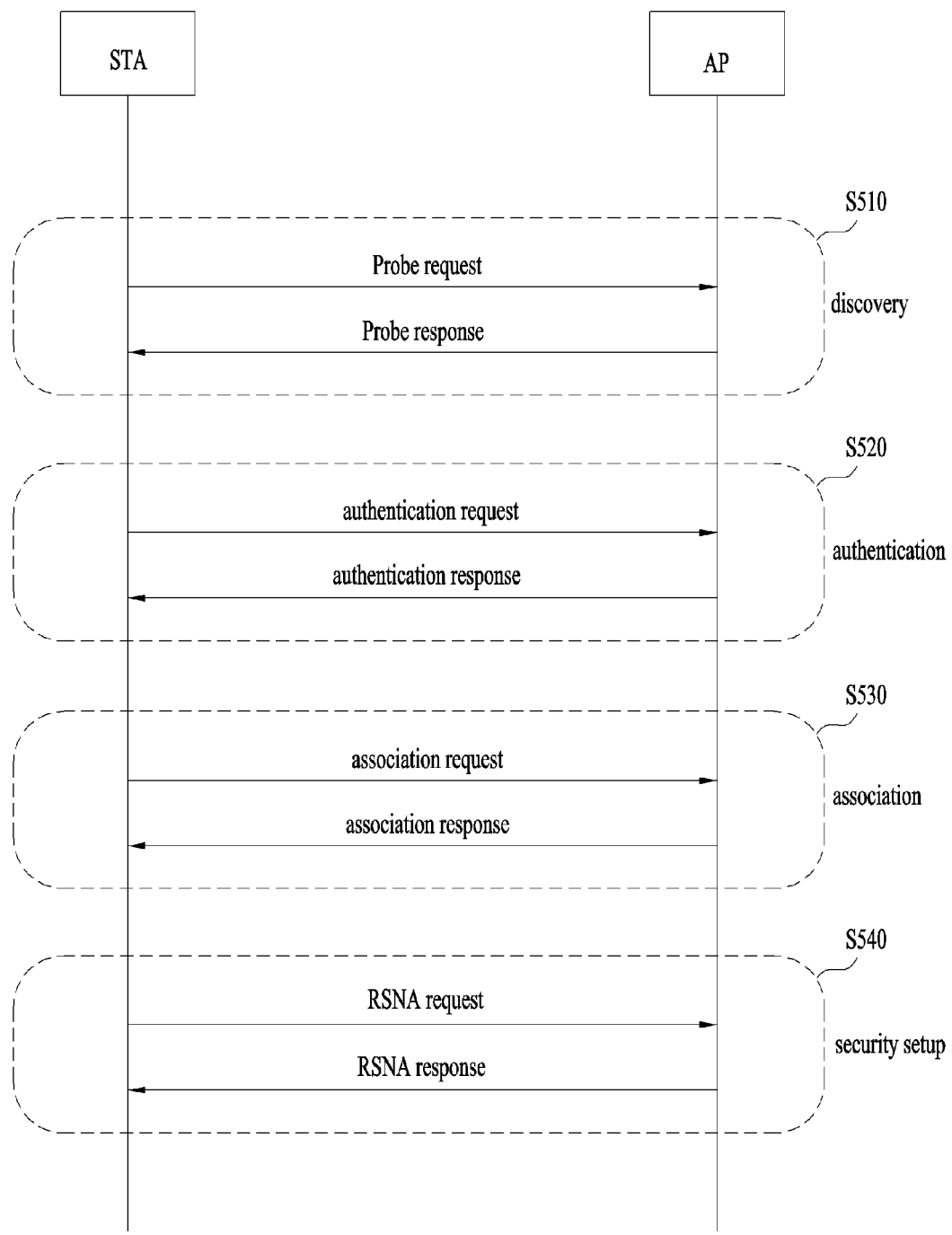
FIG. 5 is a view referred to for describing a link setup procedure in a wireless LAN system.

FIG. 5 is a view referred to for describing a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning That is, the STA should search for a joinable network to access the network. The STA needs to identify a compatible network before joining a wireless network. Identification of a network present in a specific area is referred to as scanning.

Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame.

The authentication frame may include information about an authentication algorithm number, an authentication transaction sequence number, a state code, challenge text, a Robust Security Network (RSN), a Finite Cyclic Group (FCG), etc. The above-mentioned information contained in the authentication frame is an exemplary part of information that may be included in the authentication request/response frame. The information may be replaced with other information or include additional information.

The STA may transmit the authentication request frame to the AP. The AP may determine whether to accept authentication of the STA based on the information included in the received authentication request frame. The AP may provide an authentication processing result to the STA in the authentication response frame.

After the STA is successfully authenticated, an association procedure may be performed in step S530. The association procedure includes transmission of an association request frame to the AP by the STA and transmission of an association response frame to the STA by the AP in response to the association request frame.

For example, the association request frame may include information related to various capabilities, a beacon listening interval, a Service Set Identifier (SSID), supported rates, supported channels, an RSN, a mobility domain, supported operating classes, a Traffic Indication Map (TIM) broadcast request, interworking service capability information, etc.

For example, the association response frame may include information associated with various capabilities, a status code, an Association Identification (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information is an exemplary part of information that may be included in the association request/response frame. The information may be replaced with other information or may include additional information.

After the STA is successfully associated with the network, a security setup procedure may be performed in step S540. The security setup process of step S540 may be referred to as an authentication procedure based on a Robust Security Network Association (RSNA) request/response. The authentication procedure of step S520 may be referred to as a first authentication procedure and the security setup procedure of step S540 may be referred to simply as an authentication procedure.

The security setup procedure of step S540 may include private key setup through 4-way handshaking, for example, by an Extensible Authentication Protocol over LAN (EAPOL) frame. In addition, the security setup procedure may be performed according to any other security scheme that is not defined in the IEEE 802.11 standard.

Evolution of WLAN

To overcome the limitations of WLAN in communication speed, IEEE 802.11n has recently been established as a communication standard. IEEE 802.11n seeks to increase network speed and reliability and extend wireless network coverage. More specifically, IEEE 802.11n supports a High Throughput (HT) of up to 540 Mbps or higher. To minimize transmission errors and optimize data rates, IEEE 802.11n is based on Multiple Input Multiple Output (MIMO) using a plurality of antennas at each of a transmitter and a receiver.

Along with the increased use of WLAN and the development of diverse WLAN-based applications, there is a pressing need for a new WLAN system that supports a higher throughput than a throughput supported by IEEE 802.11n. A next-generation WLAN system supporting a Very High Throughput (VHT) is the next version to IEEE 802.11n WLAN (e.g. IEEE 802.11ac). It is one of systems that have been recently proposed to support a data processing rate of 1 Gbps or higher in a MAC Service Access Point (SAP).

The next-generation WLAN system supports a Multi-User (MU)-MIMO transmission scheme in which a plurality of STAs simultaneously access a channel in order to efficiently utilize radio channels. In the MU-MIMO transmission scheme, an AP may transmit a packet to at least one MIMO-paired STA simultaneously.

In addition, support of a WLAN system operation in White Space (WS) is under discussion. For example, the introduction of a WLAN system in TV WS such as an idle frequency band (e.g. a 54 to 698 MHz band) due to transitioning from analog TV to digital TV has been discussed under the IEEE 802.11af standard. However, this is purely exemplary and the WS may be a licensed band that a licensed user may use with priority. The licensed user is a user who has authority to use the licensed band. The licensed user may also be referred to as a licensed device, a primary user, an incumbent user, etc.

For example, an AP and/or an STA operating in WS should protect a licensed user. For example, if a licensed user such as a microphone has already been using a specific WS channel, that is, a frequency band regulated to be divided by a specific bandwidth in the WS band, the AP and/or the STA are not allowed to use the frequency band of the WS channel in order to protect the licensed user. If the licensed user is to use a frequency band that the AP and/or STA is using for frame transmission and/or reception, the AP and/or the STA should discontinue using the frequency band.

Therefore, the AP and/or the STA needs to determine whether the specific frequency band of the WS band is available, that is, whether a licensed user occupies the frequency band. Determination as to whether a licensed user is present in a specific frequency band is referred to as spectrum sensing. Energy detection scheme, signature detection, etc. are used as a spectrum sensing mechanism. If the strength of a received signal is equal to or larger than a predetermined value or a DTV preamble is detected, the AP and/or the STA may determine that a licensed user is using the frequency band.

Machine-to-machine (M2M) communication is under discussion as a next-generation communication technology. A technical standard of supporting M2M communication has been developed as IEEE 802.11n ah in the IEEE 802.11 WLAN system. M2M communication is a communication scheme involving one or more machines. M2M communication may also be called Machine Type Communication (MTC) or machine-to-machine communication. A machine is an entity that does not require direct manipulation or intervention of a user. For example, not only a meter or vending machine equipped with a wireless communication module but also a User Equipment (UE) such as a smartphone capable of automatically accessing a network and communicating with the network without user manipulation/intervention may be machines. M2M communication may include Device-to-Device (D2D) communication, communication between a device and an application server, etc. Examples of communication between a device and an application server include communication between a vending machine and a server, communication between a Point Of Sale (POS) device and a server, and communication between an electric meter, a gas meter, or a water meter and a server. M2M communication-based applications may also include security, transportation, healthcare, etc. Considering the foregoing application examples, M2M communication should support occasional transmission/reception of a small amount of data at low rate under an environment with a huge number of devices.

More specifically, M2M communication should support a large number of STAs. Although a currently defined WLAN system is based on the premise that up to 2007 STAs are associated with one AP, methods for supporting association of more (about 6000) STAs with a single AP have been discussed in M2M communication. It is expected that many applications will support/require low rates in M2M communication. To fulfill these requirements, an STA may recognize the presence or absence of data to receive based on a TIM element in the WLAN system. In this regard, methods for reducing the bitmap size of the TIM have been discussed. It is also expected that much traffic will have a very long transmission/reception interval in M2M communication. For example, a very small amount of data needs to be transmitted and received at long intervals (e.g. every month), as is the case with electric/gas/water metering. Accordingly, although more and more STAs can be associated with a single AP in the WLAN system, methods for efficiently supporting a case in which a very small number of STAs are supposed to receive data frames from the AP during one beacon interval have been discussed.

As described above, the WLAN technology is rapidly evolving. Aside from the above-described examples, other techniques for performing direct link setup, improving media streaming throughput, supporting high-speed and/or large-scale initial session setup, and supporting extended bandwidth and operating frequency are being developed.

Medium Access Mechanism

In a WLAN system complying with IEEE 802.11, a basic access mechanism of the MAC layer is Carrier Sense Multiple Access with Collision Avoidance (CSMA/CA). The CSMA/CA mechanism is also referred to as Distributed Coordination Function (DCF) of the IEEE 802.11 MAC layer, which basically adopts a "listen before talk" access mechanism. In this type of access mechanism, an AP and/or an STA may sense a wireless channel or a medium during a predetermined time period (e.g. DCF Inter-Frame Space (DIFS)) by Clear Channel Assessment (CCA) before starting transmission. If the AP and/or the STA determines that the medium is idle as a result of the sensing, the AP and/or the STA starts frame transmission using the medium. On the other hand, if the AP and/or the STA determines that the medium is occupied, the AP and/or the STA does not start its transmission. Instead, the AP and/or the STA may attempt to perform frame transmission after setting a delay time (e.g. a random backoff period) for medium access and waiting for the delay time. As it is expected that multiple STAs attempt to perform frame transmission after waiting for different time periods by applying random backoff periods, collision may be minimized.

An IEEE 802.11 MAC protocol provides a Hybrid Coordination Function (HCF) which is based on a DCF and a Point Coordination Function (PCF). The PCF is a polling-based synchronous access scheme in which periodic polling is performed periodically to allow all receiving APs and/or STAs to receive a data frame. The HCF includes Enhanced Distributed Channel Access (EDCA) and HCF Controlled Channel Access (HCCA). EDCA is a contention-based access scheme used for a provider to provide a data frame to a plurality of users, and HCCA is a contention-free channel access scheme based on polling. The HCF includes a medium access mechanism for improving QoS of a WLAN.

In the HCF, QoS data may be transmitted during both a Contention Period (CP) and a Contention-Free period (CFP).

Figure 6:
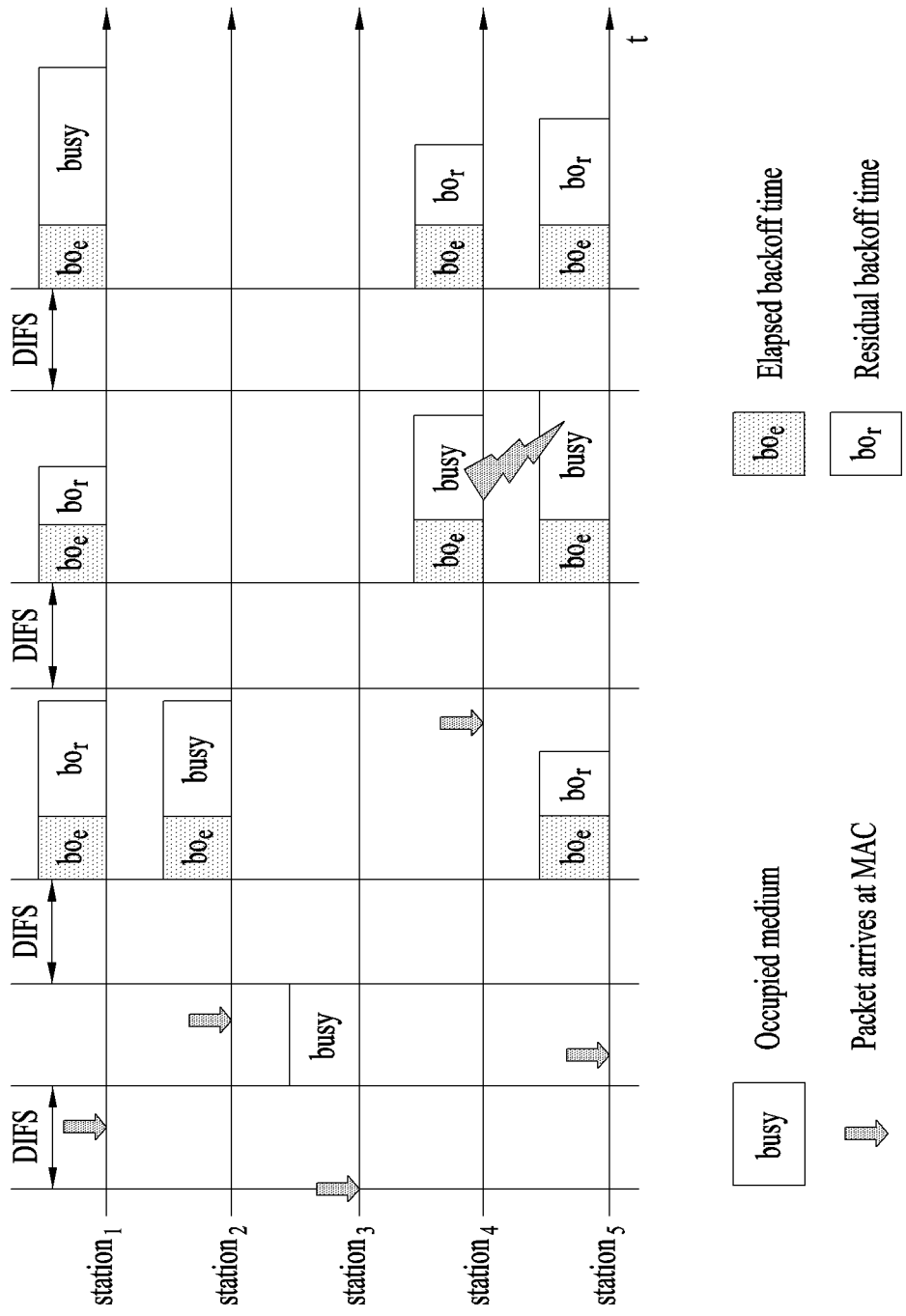
FIG. 6 is a view referred to for describing a backoff procedure.

FIG. 6 is a view referred to for describing a backoff procedure.

An operation based on a random backoff period will be described with reference to FIG. 6. If a medium transitions from an occupied or busy state to an idle state, a plurality of STAs may attempt to transmit data (or frames). To minimize collision, each STA may select a random backoff count, wait for as long a slot time period as the selected backoff count, and then attempt transmission. The random backoff count may be a pseudo-random integer and selected from a range of 0 to CW. CW is a contention window parameter. Although CWmin is initially set to CWmin, it may be doubled upon transmission failure (e.g. in the case where an ACK for a transmitted frame is not received). If CW reaches CWmax, the STAs may attempt data transmission using CWmax until the data transmission is successful. If the data transmission is successful, CW is reset to CWmin. Preferably, CW, CWmin, and CWmax may be set to $2^n-1$ (where n=0, 1, 2, ... ).

When the random backoff procedure starts, the STA continuously monitors the medium while counting down backoff slots according to the determined backoff count. If the medium is monitored as occupied, the STA discontinues the count-down and waits. When the medium becomes idle, the STA resumes the count-down of the remaining backoff slots.

In the illustrated case of FIG. 6, if a transmission packet arrives at the MAC layer of STA3, STA3 may immediately transmit a frame, confirming that the medium is idle. In the meantime, the remaining STAs monitor the medium as busy and wait. While the remaining STAs wait, transmission data may be generated in each of STA1, STA2, and STA5. If each of STA1, STA2, and STA5 monitors the medium as idle, the STA may wait for a DIFS and then count down backoff slots according to its selected random backoff count. In FIG. 6, STA2 selects a smallest backoff count and STA1 selects a largest backoff count That is, at the moment STA2 finishes backoff counting and then starts to transmit a frame, the residual backoff time of STA5 is shorter than that of STA1. While STA is occupying the medium, STA1 and STA5 temporarily discontinue count-down and wait. If STA2 does not occupy the medium any longer and thus the medium becomes idle, STA1 and STA5 wait for a DIFS and resume the backoff counting. That is, after counting down as many remaining backoff slots as the remaining residual backoff time, each of STA1 and STA5 may start frame transmission. Since the residual backoff time of STA5 is shorter than that of STA1, STA5 starts frame transmission. While STA2 is occupying the medium, transmission data may also be generated in STA4. If the medium becomes idle, STA4 may wait for the DIFS, count down backoff slots according to its selected random backoff count, and then start frame transmission. In FIG. 6, the residual backoff time of STA5 happens to be equal to that of STA4. In this case, collision may occur between STA4 and STA5. When collision occurs, either STA4 or STA5 does not receive an ACK, resulting in data transmission failure. Then, STA4 and STA5 may double CW values, select random backoff counts, and then count down backoff slots. While the medium is occupied for transmission of STA and STA5, STA1 may wait. Then if the medium becomes idle, STA1 may wait for the DIFS and start frame transmission after its residual backoff time.

Sensing Operation of STA

As described before, the CSMA/CA mechanism includes virtual carrier sensing as well as physical carrier sensing in which an AP and/or an STA directly senses a medium. Virtual carrier sensing is performed to overcome problems that may be encountered with medium access, such as a hidden node problem. For virtual carrier sensing, the MAC layer of the WLAN system may use a Network Allocation Vector (NAV). An AP and/or an STA, which is currently using the medium or has authority to use the medium, indicates a time left until the medium is available to anther AP and/or another STA by a NAV. Accordingly, the NAV indicates a time period scheduled for the AP and/or the STA transmitting the frame to use the medium. Upon receipt of the NAV, an STA is not allowed to access the medium during the time period. The NAV may be set, for example, according to a value set in a "duration" field of a MAC header of a frame.

A robust collision detection mechanism has been introduced to reduce the probability of collision. This robust collision detection mechanism will be described with reference to FIGS. 7 and 8. While a carrier sensing range may be different from a transmission range in real implementation, it is assumed that the carrier sensing range and the transmission range are the same, for the convenience of description.

Figure 7:
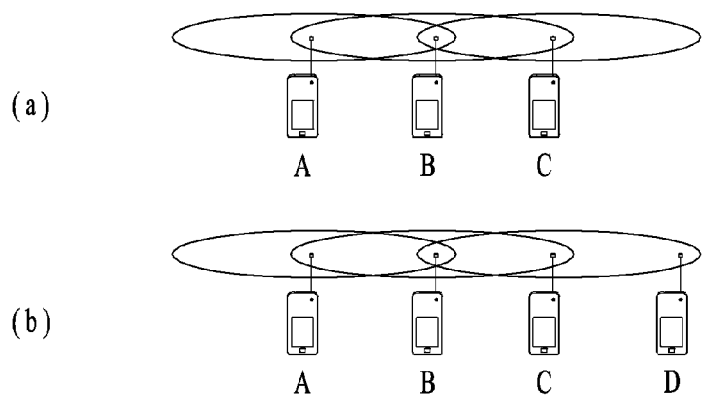
FIG. 7 is a view referred to for describing hidden nodes and exposed nodes.

FIG. 7 is a view referred to for describing hidden nodes and exposed nodes.

FIG. 7(a) illustrates an exemplary hidden node. In FIG. 7(a), STA A is communicating with STA B, and STA C has information to be transmitted. Specifically, STA C may determine that a medium is idle during carrier sensing before transmitting data to STA B, although STA A is transmitting information to STA B. This may occur because transmission of STA A (i.e. occupation of the medium) may not be detected at the location of STA C. As a result, STA B receives information from STA A and STA C simultaneously and thus collision occurs. Herein, STA A may be a hidden node to STA C.

FIG. 7(b) illustrates an exemplary exposed node. In FIG. 7(b), while STA B is transmitting data to STA A, STA C has information to be transmitted to STA D. If STA C performs carrier sensing, STA C may determine that a medium is occupied due to transmission of STA B. Therefore, although STA C has information to be transmitted to STA D, STA C should wait until the medium is idle since the medium is sensed as occupied. However, since STA A is actually located out of the transmission range of STA C, transmission from STA C may not collide with transmission from STA B from the viewpoint of STA A. Thus, STA C unnecessarily waits until STA B discontinues transmission. Herein, STA C may be an exposed node to STA B.

Figure 8:
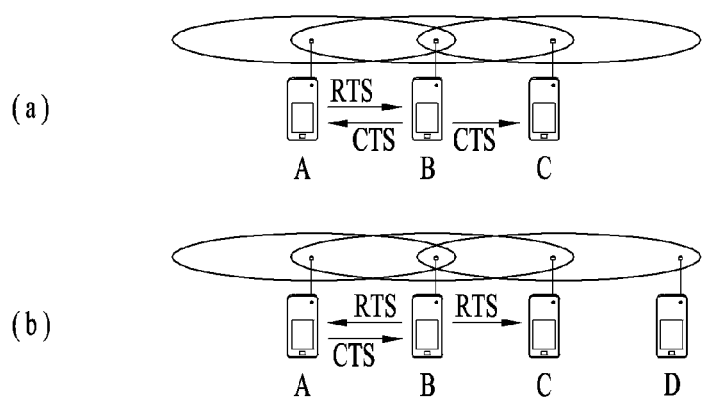
FIG. 8 is a view referred to for describing RTS and CTS.

FIG. 8 is a view referred to for describing Request To Send (RTS) and Clear To Send (CTS).

To efficiently utilize a collision avoidance mechanism in the exemplary situation of FIG. 7, short signaling packets such as RTS and CTS may be used. RTS/CTS between two STAs may be overheard by neighboring STA(s), so that the neighboring STA(s) may determine whether information is transmitted between the two STAs. For example, if a transmitting STA transmits an RTS frame to a receiving STA, the receiving STA may indicate to its neighboring STAs that it will receive data by transmitting a CTS frame to the peripheral STAs.

FIG. 8(a) illustrates an exemplary method for solving the hidden node problem. In FIG. 8(a), it is assumed that both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

FIG. 8(b) illustrates an exemplary method for solving an exposed node problem. STA C may overhear RTS/CTS transmission between STA A and STA B and thus may determine that no collision will occur although STA C transmits data to another STA (e.g. STA D). That is, STA B transmits an RTS frame to all neighboring STAs and only STA A having actual transmission data may transmit a CTS frame. Because STA C receives only the RTS frame without receiving the CTS frame from STA A, it may determine that STA A is located outside the carrier sensing range of STA C.

Power Management

As described before, an STA should perform channel sensing before transmission and reception in a WLAN system. Continuous channel sensing causes continuous power consumption of the STA. Considering that power consumption in a reception state is almost the same as power consumption in a transmission state, maintaining the reception state imposes a great load on a power-limited STA (i.e. an STA operated by a battery). Therefore, if the STA is kept in a reception standby state to continuously sense a channel, the STA inefficiently consumes power, without any special advantage in terms of WLAN throughput. In avert this problem, the WLAN system supports a Power Management (PW) mode for an STA.

The PM mode of the STA is classified into an active mode and a Power Save (PS) mode. The STA basically operates in the active mode. The STA operating in the active mode is kept awake. In the awake state, the STA may perform normal operations including frame transmission and reception, channel scanning, etc. On the other hand, the STA switches between a sleep state and an awake state in the PS mode. In the sleep state, the STA operates with minimum power, without performing frame transmission and reception and channel scanning.

As the STA operates longer in the sleep state, the STA consumes less power, thus lengthening an operation time. However, the STA may not stay in the sleep state unconditionally because it is impossible to transmit or receive a frame in the sleep state. In the presence of a frame to be transmitted to an AP, a sleep-state STA may switch to the awake state and then transmit the frame in the awake state. If the AP has a frame to be transmitted to the STA, the sleep-state STA is unable to receive the frame and does not know the presence of a frame to be received. Accordingly, the STA may need to switch to the awake state in every specific period to determine the presence or absence of a frame to receive (or to receive a frame in the presence of the frame to receive).

Figure 9:
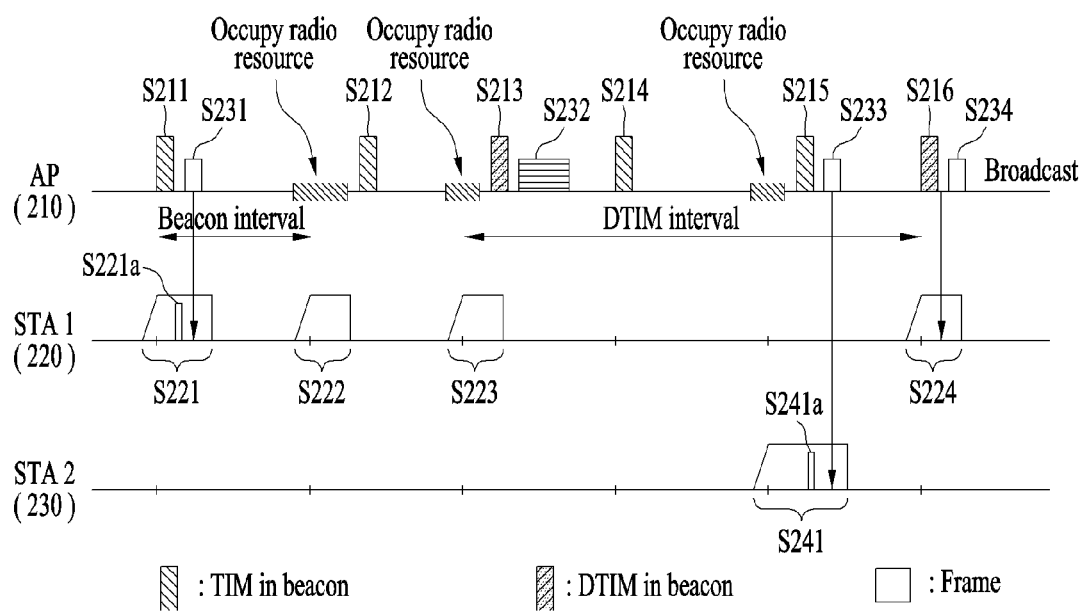
FIG. 9 is a view referred to for describing a power management operation.

FIG. 9 is a view referred to for describing a power management operation.

Referring to FIG. 9, an AP 210 transmits a beacon frame to STAs within a BSS at every predetermined interval (S211, S212, S213, S214, S215, and S216). The beacon frame includes a TIM information element. The TIM information element includes information indicating that the AP 210 has buffered traffic for STAs associated with the AP 210 and will transmit frames to the STAs. The TIM information element includes a TIM indicating a unicast frame and a Delivery Traffic Indication Map (DTIM) indicating a multicast or broadcast frame.

The AP 210 may transmit a DTIM once every three beacon frame transmissions. Each of STA1 220 and STA2 222 operate in the PS mode. STA1 220 and STA2 222 may be configured to switch from the sleep state to the awake state at every wakeup interval of a predetermined period and to receive the TIM information element from the AP 210. Each STA may calculate a switching time at which it will switch to the awake state based on its own local clock. In FIG. 9, it is assumed that the STAs have the same clock as the AP.

For example, the predetermined wakeup interval may be set in such a manner that STA1 220 may switch to the awake state in each beacon interval to receive the TIM element. Accordingly, when the AP 210 first transmits the beacon frame (S211), STA1 220 may switch to the awake state (S212). STA1 220 may receive the beacon frame and acquire the TIM information element from the beacon frame. If the TIM information element indicates the presence of a frame to be transmitted to STA1 220, STA1 220 may transmit to the AP 210a a Power Save-Poll (PS-Poll) frame requesting transmission of the frame (S221a). The AP 210 may transmit the frame to STA1 220 in response to the PS-Poll frame (S231). Upon complete receipt of the frame, STA1 220 returns to the sleep state.

When the AP 210 transmits the beacon frame at a second time, another device accesses the medium and thus the medium is busy. Therefore, the AP 210 may not transmit the beacon frame at the accurate beacon interval. Instead, the AP 210 may transmit the beacon frame at a delayed time (S212). In this case, although STA1 220 switches to the awake state at the beacon interval, STA1 fails to receive the delayed beacon frame and thus returns to the sleep state (S222).

When the AP 210 transmits the beacon frame at a third time, the beacon frame may include a TIM information element configured as a DTIM. However, since the medium is busy, the AP 210 transmits the beacon frame at a delayed time (S213). STA1 220 may switch to the awake state at the beacon interval and acquire the DTIM from the beacon frame received from the AP 210. It is assumed that the DTIM indicates the absence of a frame to be transmitted to STA1 220 and the presence of a frame to be transmitted to another STA. Then, STA1 220 may return to the sleep state, determining that there is no frame to be received. After transmitting the beacon frame, the AP 210 transmits the frame to the corresponding STA (S232).

The AP 210 transmits the beacon frame at a fourth time (S214). However, since STA1 220 has not acquired information indicating the presence of traffic buffered for STA1 220 from the previous twice-received TIM information element, STA1 220 may adjust the wakeup interval to receive the TIM information element. Or if a beacon frame transmitted by the AP 210 includes signaling information for adjusting the wakeup interval of STA1 220, the wakeup interval of the STA1 220 may be adjusted. In this example, STA1 220 may be configured to change its operation state from one wake-up in every beacon interval to one wake-up in every 3 beacon intervals, in order to receive a TIM information element. Therefore, when the AP 210 transmits a fourth beacon frame (S214) and transmits a fifth beacon frame (S215), STA1 220 is kept in the sleep state and thus may not acquire a corresponding TIM information element.

When the AP 210 transmits the beacon frame at a sixth time (S216), STA1 220 may switch to the awake state and acquire a TIM information element from the beacon frame (S224). The TIM information element is a DTIM indicating the presence of a broadcast frame. Accordingly, STA1 220 may receive the broadcast frame from the AP 210 without transmitting a PS-Poll frame to the AP 210 (S234). In the meantime, a wakeup interval configured for STA2 230 may be set to be longer than the wakeup interval of STA1 220.

Thus, when the AP 210 transmits the beacon frame at the fifth time (S215), STA2 230 may enter the awake state and receive the TIM information element (S241). STA2 230 may determine the presence of a frame to receive by the TIM information element and transmit a PS-Poll frame to the AP 210 to request frame transmission (S241a). The AP 210 may transmit the frame to STA2 230 in response to the PS-Poll frame (S233).

To implement the PS mode as illustrated in FIG. 9, a TIM element includes either a TIM indicating the presence or absence of a frame to be transmitted to an STA or a DTIM indicating the presence or absence of a broadcast/multicast frame. The DTIM may be configured by setting a field in the TIM element.

Figure 10:
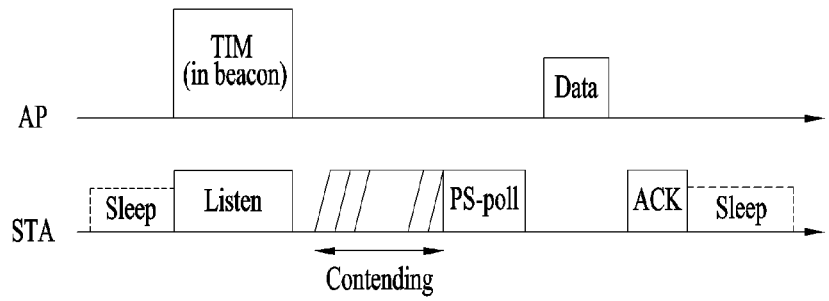
FIGS. 10, 11, and 12 are views referred to for describing an operation of an STA that has received a TIM in detail.
Figure 11:
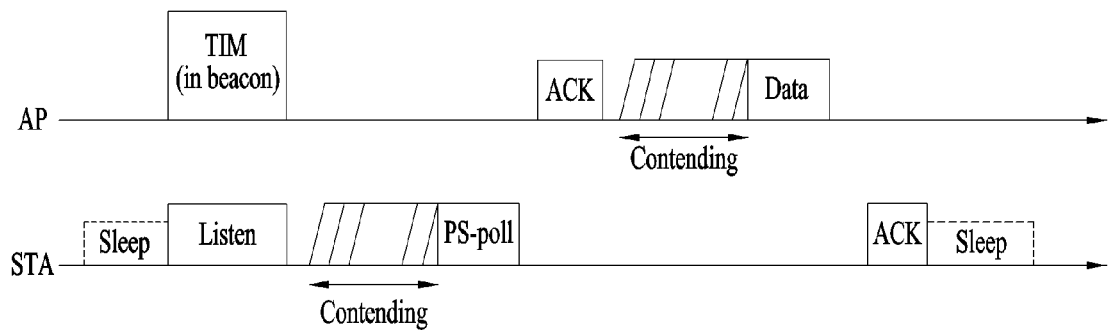
Figure 12:
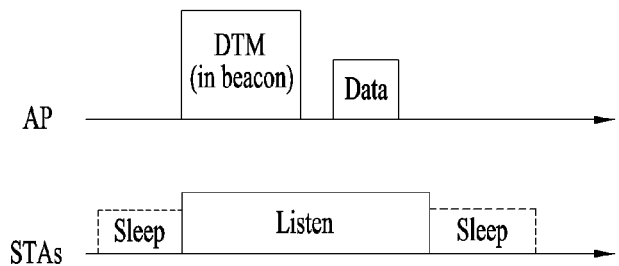

FIGS. 10, 11, and 12 are views referred to for describing an operation of an STA that has received a TIM in detail.

Referring to FIG. 10, an STA switches from a sleep state to an awake state to receive a beacon frame including a TIM element from an AP. The STA may determine the presence of buffered traffic directed to the STA by interpreting the received TIM element. After contending with other STAs to access a medium for transmission of a PS-Poll frame, the STA may transmit a PS-Poll frame requesting data frame transmission to the AP. Upon receipt of the PS-Poll frame from the STA, the AP may transmit the frame to the STA. The STA may receive a data frame and then transmit an ACKnowledgment (ACK) frame to the AP in response to the received data frame. Subsequently, the STA may return to the sleep state.

As illustrated in FIG. 10, the AP may receive the PS-Poll frame from the STA and transmits the data frame after a predetermined time (e.g. a Short InterFrame Space (SIFS)) according to an immediate response scheme. If the AP does not prepare a data frame to be transmitted to the STA during the SIFS after receiving the PS-Poll frame, the AP may operate according to a deferred response scheme, which will be described with reference to FIG. 11.

As in the example of FIG. 10, an STA switches from a sleep state to an awake state, receives a TIM from an AP, and transmits a PS-Poll frame to the AP through contention in the illustrated case of FIG. 11. If the AP does not prepare a data frame during an SIFS after receiving the PS-Poll frame, the AP may transmit an ACK frame to the STA, instead of the data frame. If the AP prepares the data frame after transmitting the ACK frame, the AP may transmit the data frame to the STA after contention. The STA may transmit, to the AP, an ACK frame indicating that the data frame has been received successfully and may switch to the sleep state.

FIG. 12 illustrates an exemplary case in which an AP transmits a DTIM. STAs may switch from the sleep state to the awake state to receive a beacon frame including a DTIM element from the AP. The STAs may determine from the received DTIM that a multicast/broadcast frame will be transmitted to them. After transmitting the beacon frame including the DTIM, the AP may directly transmit data (i.e. the multicast/broadcast frame) without receiving a PS-Poll frame. The STAs receives the data in the awake state in which they are kept after receiving the beacon frame including the DTIM. Upon complete receipt of the data, the STAs may return to the sleep state.

TIM Structure

In the PS-mode operation method based on the TIM (or DTIM) protocol described above with reference to FIGS. 9 to 12, an STA may determine whether there is a data frame to be transmitted to the STA by STA identification information included in a TIM element. The STA identification information may be information related to an AID which is allocated to an STA when the STA is associated with an AP.

An AID is used as a unique ID of each STA within one BSS. For example, the AID may be one of 1 to 2007 in the current WLAN system. In the currently defined WLAN system, 14 bits may be allocated to an AID in a frame transmitted by an AP and/or an STA. Although the AID value may be assigned up to 16383, the values of 2008 to 16383 are reserved.

An already defined TIM element is not suitable for M2M applications through which many STAs (for example, more than 2007 STAs) may be associated with one AP. If the conventional TIM structure is extended without any change, a TIM bitmap gets too large in size. As a consequence, the extended TIM structure may not be supported using a legacy frame format and is inappropriate for M2M communication for which low-rate applications are considered. In addition, it is expected that a very small number of STAs are supposed to receive a data frame during one beacon interval. Therefore, considering the afore-mentioned M2M communication application examples, it is expected that the size of a TIM bitmap will be increased but most bits of the TIM bitmap are set to zero (0) in many cases. In this context, there is a need for a method for efficiently compressing a bitmap.

Conventionally, successive zeroes at the start of a bitmap are omitted and represented by an offset (or a starting point) in order to compress the bitmap. However, if there are buffered frames for a small number of STAs but the AID values of the STAs are highly different from one another, compression efficiency is not high. For example, if buffered frames are destined for only two STAs having AIDs of 10 and 2000, respectively, the resulting compressed bitmap is of length 1990 and has all zeros except for non-zeroes at both ends. If a small number of STAs can be associated with one AP, inefficiency of bitmap compression does not matter much. On the contrary, if the number of STAs associable with one AP increases, such inefficiency may degrade overall system performance.

Figure 13:
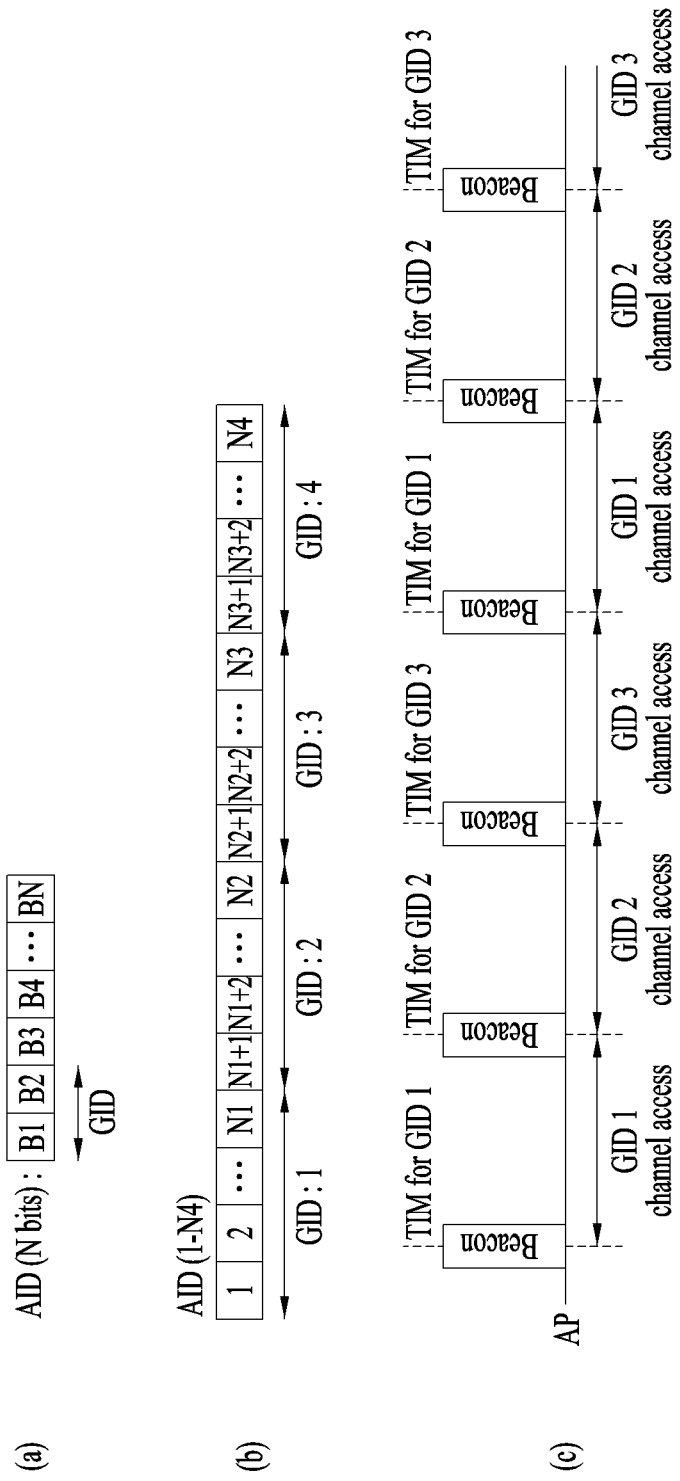
FIG. 13 is a view referred to for describing a group based AID.

To overcome the problem, AIDs may be divided into a plurality of groups, for more effective data transmission. A predetermined Group ID (GID) is allocated to each group. AIDs allocated on a group basis will be described below with reference to FIG. 13.

FIG. 13(a) illustrates an example of AIDs allocated on a group basis. In FIG. 13(a), a few first bits of an AID bitmap may be used to indicate a GID. For example, 4 GIDs may be represented in the first 2 bits of the AID bitmap. If the AID bitmap includes N bits in total, the first 2 bits (B1 and B2) may represent the GID of the AIDs.

FIG. 13(a) illustrates another example of AIDs allocated on a group basis. In FIG. 13(b), GIDs may be allocated according to the positions of the AIDs. In this case, AIDs having the same GID may be represented by an offset and a length. For example, if GID 1 is represented by offset A and length B, this means that AIDs ranging from A to A+B−1 in a bitmap have GID 1. For example, it is assumed in FIG. 13(b) that AIDs ranging from 1 to N4 are divided into four groups. In this case, AIDs belonging to GID 1 are 1 to N1 and thus may be represented by offset 1 and length N1. AIDs belonging to GID 2 may be represented by offset N1+1 and length N2−N1+1, AIDs belonging to GID 3 may be represented by offset N2+1 and length N3−N2+1, and AIDs belonging to GID 4 may be represented by offset N3+1 and length N4−N3+1.

As this group-based AID allocation enables channel access during different time periods according to GIDs, lack of TIM elements for a large number of STAs may be overcome and data may be transmitted and received efficiently, as well. For example, channel access is available only to an STA(s) of a specific group, while channel access may be restricted for the other STA(s), during a specific time period. The specific time period during which channel access is available only to the STA(s) of the specific group may be called a Restricted Access Window (RAW).

With reference to FIG. 13(c), GID-based channel access will be described below. FIG. 13(c) illustrates an exemplary channel access mechanism based on beacon intervals, when AIDs are divided into three groups. A first beacon interval (or a first RAW) is a time period during which channel access is allowed for STAs having the AIDs of GID 1 and denied for the STAs belonging to the other GIDs. To implement this mechanism, a TIM element only for the AIDs of GID 1 is included in a first beacon. A TIM element only for the AIDs of GID 2 is included in a second beacon frame. Accordingly, channel access is allowed only for STAs having the AIDs of GID 2 during a second beacon interval (or a second RAW). A TIM element only for the AIDs of GID 3 is included in a third beacon frame, so that channel access may be allowed only for STAs having the AIDs of GID 3 during a third beacon interval (or a third RAW). A TIM element only for the AIDs of GID 1 is included in a fourth beacon frame, so that channel access may be allowed only for the STAs having the AIDs of GID 1 during a fourth beacon interval (or a fourth RAW). In the same manner, channel access may be allowed only for the STAs of a specific group indicated by a TIM included in a corresponding beacon frame during each of beacon intervals following the fifth beacon interval (or during each of RAWs following the fifth RAW).

While the order of allowed GIDs is cyclic or periodic according to the beacon intervals in FIG. 13(c), this should not be construed as limiting the present invention. That is, as only an AID(s) having a specific GID(s) may be included in a TIM element, channel access may be allowed only for an STA(s) having the specific AID(s) and denied for the remaining STA(s), during a specific time interval (e.g. a specific RAW).

The above group-based AID allocation scheme may be referred to as a hierarchical TIM structure. That is, a total AID space is divided into a plurality of blocks and channel access is allowed only for an STA(s) (i.e. an STA(s) of a specific group) corresponding to a specific block(s) having non-zero values. Therefore, since a large-sized TIM is divided into small-sized blocks/groups, an STA may easily maintain TIM information and the blocks/groups may be easily managed according to the class, QoS, or usage of the STA. Although FIG. 13 exemplarily illustrates a 2-level layer, a hierarchical TIM structure with two or more levels may be configured. For example, a total AID space may be divided into a plurality of page groups, each page group may be divided into a plurality of blocks, and each block may be divided into a plurality of sub-blocks. Then, the example of FIG. 13(a) may be extended in such a manner that first N1 bits of an AID bitmap represent a Page ID (i.e. PID), the next N2 bits represent a block ID, the next N3 bits represent a sub-block ID, and the remaining bits represent the position of STA bits included in a sub-block.

In the following examples of the present invention, STAs (or AIDs allocated to the respective STAs) may be divided into predetermined hierarchical groups and managed in various manners. However, the group-based AID allocation scheme is not limited to the specific examples.

RAW (Restricted Access Window)

Collision occurring when STAs simultaneously perform access may deteriorate a medium use rate. Accordingly, a RAW may be used as a method for dispersing channel access of (group based) STAs. An AP can allocate a medium access interval called a RAW between beacon intervals. Information (restricted access window parameter set (RPS) element) related thereto can be transmitted using a (short) beacon frame. In addition to the RAW, the AP may allocate one or more RAWs related to a different RAW parameter for a different group between the beacon intervals.

Figure 14:
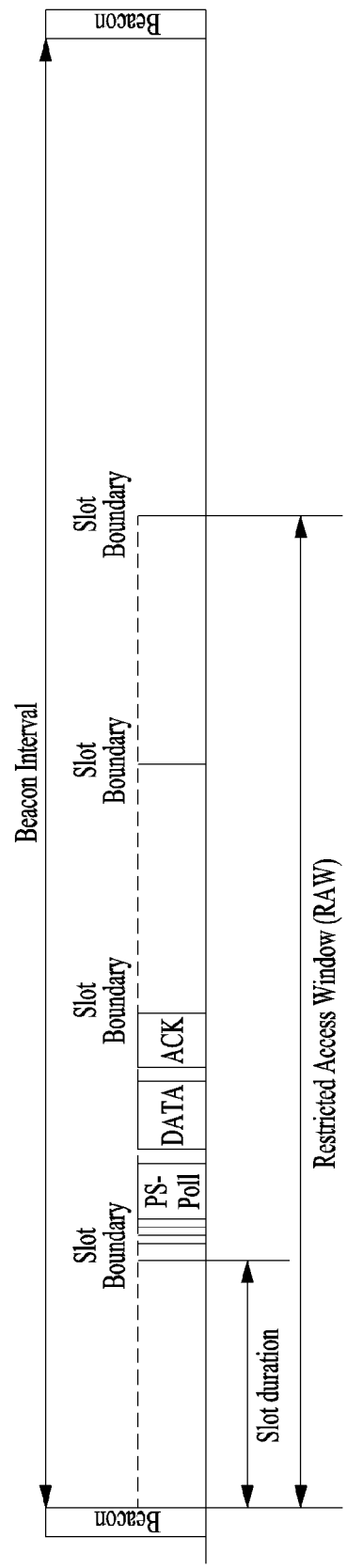

FIG. 14 illustrates an exemplary RAW. Referring to FIG. 14, STAs in a specific group corresponding to the RAW can perform access in the RAW (more specifically, one of slots corresponding to the RAW). Here, the specific group may be indicated by a RAW group field, which will be described later, or the like. That is, an STA can recognize whether the STA corresponds to the specific group (RAW group) by determining whether the AID thereof belongs to an AID range indicated by the RAW group field or the like. For example, when the AID of the STA is equal to or greater than the lowest AID (N1) allocated to the RAW and equal to or smaller than the highest AID (N2) allocated to the RAW, the STA can be considered to belong to the RAW group indicated by the RAW group field. Here, N1 can be determined as a chain of a page index subfield and a RAW start AID subfield and N2 can be determined as a chain of the page index subfield and a RAW end AID subfield. The subfields can be included in a RAW group subfield in the RPS element.

When the STA corresponds to the RAW group illustrated in FIG. 14 (and is paged), the STA can perform access by transmitting a PS-poll frame on the basis of DCF and EDCA in a slot allocated thereto. Here, the allocated slot may be one of the slots included in the RAW, allocated by the AP. Slot allocation may be performed in a manner as shown in FIG. 15. In FIGS. 15(a) and 15(b), a slot is basically determined by $i_{slot}=(x+N_{offset}) \bmod N_{RAW}$. Here, x indicates the AID of the STA, $i_{slot}$ indicates a slot index allocated to the STA, $N_{offset}$ represents two LSBs (Least significant bytes) of the FCS field of the (short) beacon frame, and $N_{RAW}$ represents the number of time slots included in the RAW and can be determined from a RAW slot definition subfield in the RPS element. FIG. 15(a) illustrates slot allocation which is not restricted by whether the corresponding AID is set to 1 in a TIM bitmap and FIG. 15(b) illustrates a case in which a slot is allocated only to an AID which is set to 1 in the TIM bitmap.

When a plurality of APs is installed in a specific area in order to support a larger number of UEs/traffic in the aforementioned 802.11 system or when the BSS coverage of a specific AP overlaps all or part of the BSS coverage of a neighboring AP, interference may become a problem. This is described in more detail with reference to FIGS. 16 and 17. FIG. 16 illustrates an example of interference. Serious interference may occur according to link direction. That is, when STA-1 performs uplink transmission, as shown in FIG. 16, uplink transmission of STA-1 may act as very serious interference applied to downlink reception of STA-2. FIG. 17 illustrates another example of interference. Particularly, FIG. 17 shows a case in which one BSS is included in another BSS. Referring to FIG. 17(a), when STA-L receives a downlink signal from AP-L, an uplink signal transmitted by STA-S to AP-S may act as serious interference. Referring to FIG. 17(b), when STA-S receives a downlink signal from AP-S, an uplink signal transmitted by STA-L to AP-L may act as serious interference. To solve such interference problem including the aforementioned examples, OBSS interference management may be performed through data traffic blanking for a specific time duration by setting a NAV. In this case, however, access of all STAs other than the corresponding STA is prohibited in an interval in which the NAV is set and thus resource availability is remarkably reduced. The resource availability further decreases as the number of STAs and the number of coexisting BSSs increase. Accordingly, description will be given of embodiments of the present invention for efficiently handling interference.

Embodiment 1

The first embodiment makes link directions of STAs, which affect each other, coincide with each other. That is, downlink traffic intervals and uplink traffic intervals of STAs involved in interference are aligned. Specifically, an STA can perform CCA (or preamble/frame detection and the like) prior to transmission and reception of data. When power equal to or higher than a predetermined level is detected as a result of CCA, the STA can transmit a request for setting an (uplink) interval to an AP.

When power equal to or higher than the predetermined level has resulted from uplink transmission of an STA belonging to a different BSS, the AP can transmit interval information synchronized with interval information of the different BSS to the STA. Here, the interval information synchronized with the interval information of the different BSS may have a specific link direction (e.g., uplink or downlink) which is the same as the link direction corresponding to the interval information of the different BSS. For example, the AP may set n beacon intervals for uplink transmission and the n beacon intervals may be used for uplink transmission in the different BSS. When power equal to or higher than the predetermined level has resulted from downlink transmission or the AP determines that it is difficult to set an interval for uplink traffic transmission or to allocate an interval to the STA that has sent the request for setting the interval, the AP can transmit a response indicating restriction of channel access (or information on an interval configured as a blanking interval).

Figure 18:
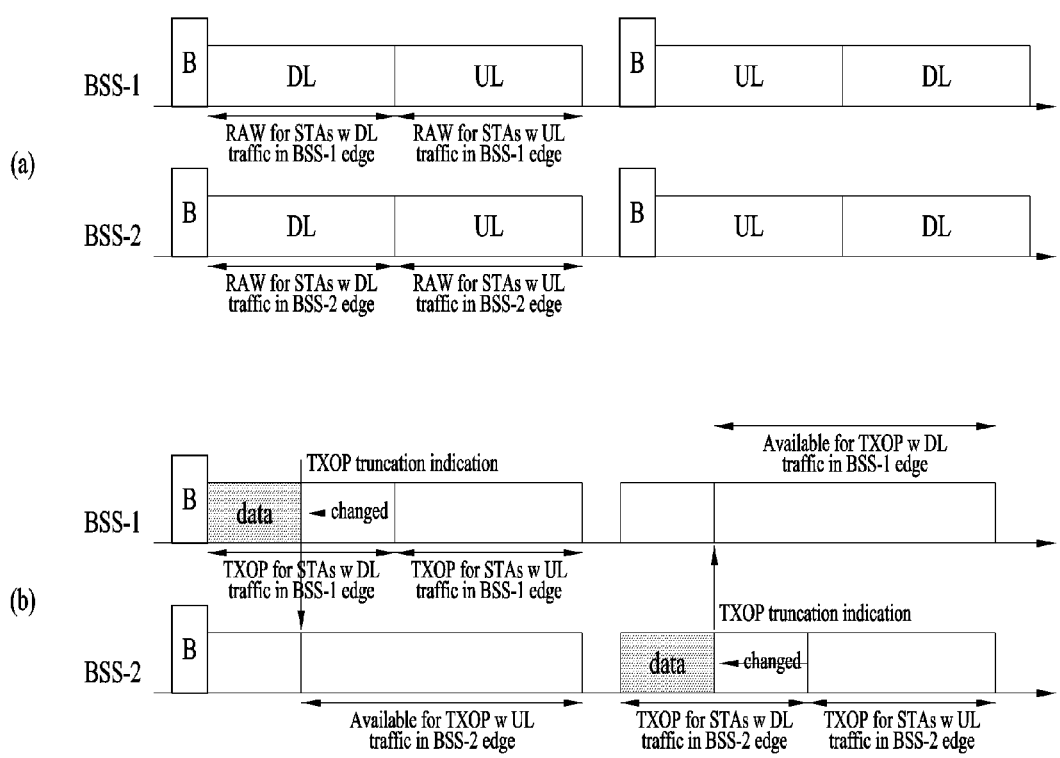

The interval information synchronized with the interval information of the different BSS, transmitted by the AP to the STA, may be related to a RAW or TXOP, which is illustrated in FIG. 18. In FIG. 18, BSS-1 refers to the BSS including the AP and the STA and BSS-2 refers to the different BSS.

Referring to FIG. 18, an AP of BSS-1 may set a RAW for downlink transmission and a RAW for uplink transmission. The RAW for downlink transmission and the RAW for uplink transmission may be synchronized with RAWs set by BSS-2 and have the same link direction as the RAWs set by BSS-2. The STA may perform transmission or reception in a link direction corresponding to the RAW including a slot corresponding to the AID thereof. In this case, all STAs belonging to different BSSs perform uplink transmission or downlink transmission at the same timing, as shown in FIG. 19, and thus it is possible to avoid a situation in which uplink transmission of a specific STA interferes with downlink reception of another STA. The AP may group STAs located at the edge of the corresponding BSS and allocate a RAW for the STA group.

The interval information transmitted by the AP may be a TXOP (Transmission Opportunity) time duration. Here, the TXOP time duration may be synchronized with a TXOP time duration set in a BSS including an STA/AP to which interference is applied and have the same link direction as that corresponding to the TXOP time duration. In this case, the STA may perform transmission or reception in the link direction, which is set in the TXOP time duration, in the TXOP time duration. When TXOP truncation is applied to the TXOP time duration, information on the TXOP truncation may be transmitted to an AP of a BSS related to uplink transmission. Specifically, referring to FIG. 18(*b*), when TXOP set in BSS-1 is truncated, the AP of BSS-1 may update TXOP configuration and information about TXOP configuration update (TXOP truncation indication) may be transmitted to the AP of BSS-2. However, this is recommendation regarding TXOP update and the AP of BSS-2 may update TXOP thereof, as shown in FIG. 18, or may not update the TXOP according to traffic state.

When the BSS to which the STA and the AP belong includes the coverage of the AP of the different BSS in the above description, the STA needs to be located outside the coverage of the AP of the different BSS. That is, when the STA is STA-L in FIG. 17(*a*), STA-L needs to be located outside the coverage of AP-S, as shown in FIG. 17(*a*). Here, it is possible to determine whether STA-L is located outside the coverage of AP-S on the basis of detection of frame transmission/reception of the different BSS by STA-L. More specifically, when STA-L does not detect a CTS frame transmitted from AP-S (which may be a non-SP STA, differently from the illustrated example) within a predetermined time after detecting a predetermined frame (e.g., RTS frame) transmitted from STA-S, it is possible to determine that STA-L does not belong to the coverage of AP-S.

In FIG. 17(*a*), when STA-S performs CCA (or preamble/frame detection or the like) and power equal to or higher than a specific level is detected, AP-L may be requested to set an interval (RAW, TXOP or the like) for uplink transmission (or interval in which downlink traffic transmission is restricted/avoided) upon determining that downlink transmission is performed in BSS-L. AP-S may transmit the aforementioned response to such request. In addition, when downlink traffic transmission from AP-L to STA-L is detected as power equal to or higher than a specific level, it is difficult to solve interference problems through downlink/uplink traffic alignment. Accordingly, the corresponding AP may blank data transmission thereof according to NAV configuration or attempt new access to an AP of another BSS.

Embodiment 2

The second embodiment relates to a beam pattern. More specifically, different beam patterns may be operated for two neighboring STAs. For example, when it is assumed that three physically divided sectors are present, neighboring BSSs perform BSS-coordinated sectorized beam operation through coordination.

Embodiment 2 in the situation shown in FIG. 16 is described in detail. When STA-2 detects OBSS in a neighboring BSS (that is, when STA-2 detects transmission of data including a different BSSSID), STA-2 may check a beam pattern used for the data transmission and request transmission using a beam pattern different from the beam pattern to AP-2, instead of setting a NAV for the corresponding channel access interval. AP-2 may check whether the corresponding beam pattern is available and then transmit a response to the request of STA-2. If transmission to STA-2 continuously fails, AP-2 may consider use of a beam pattern different from the beam pattern being used even if there is no request from STA-2. Beam pattern change by an AP may involve signaling for informing an STA of beam pattern change. When STA-1 detects OBSS, STA-1 may set a sectorized beam pattern of uplink transmission thereof differently from a neighboring beam pattern or adjust transmission power. To this end, capability negotiation about whether a sectorized beam pattern can be operated needs to be performed between an STA and an AP. In the case of a fixed STA (e.g., a smart meter, a home equipped device/sensor and the like), capability negotiation for a sectorized beam pattern can be performed in the initial link setup step (access/authentication and the like). When the sectorized beam pattern can be operated, as many TXOPs as the number of independent sectorized beam patterns can be set/operated.

FIG. 20 illustrates an exemplary environment to which a sectorized beam pattern is applicable. Referring to FIG. 20, data transmission and reception between AP-L and STA-L interfere with data transmission and reception between AP-S and STA-S. When it is determined that channel access is difficult to perform in BSS-S since transmission and reception between AP-L and STA-L are continuously detected, AP-S can send a request signal for requesting a sectorized beam pattern to AP-L. Upon reception of the request signal, AP-L can initiate a sectorized beam training sequence/frame transmission interval and transmit/receive a training sequence/frame to/from STA-L periodically or for a specific time. (The training sequence/frame may be of NDP TRS/CTS type and transmission interval information or period information is included in a response frame to AP-S such that AP-S or STA-S can scan the training frame.) When AP-S or STA-S determines that frame exchange using a specific sectorized beam pattern between AP-L and STA-S does not affect AP-S or STA-S (that is, when AP-S or STA-S determines that the frame exchange does not act as effective interference), AP-S or STA-S can feed back corresponding sectorized beam pattern information (or sector ID information) to AP-L. Upon reception of such information, AP-L and STA-L can perform transmission and reception using the corresponding sectorized beam pattern. When an available sectorized beam pattern is not present, AP-L may configure a feedback response for restricting channel access and a blanking interval for AP-S. When communication between AP-S and STA-S is ended (when data traffic transmission and reception are finished), a signal indicating the end of communication (end of service indication or the like) can be signaled to AP-L.

Embodiment 3

The third embodiment relates to transmission and reception of improved probe request and response frames. The following description can be applied to embodiments 1 and 2. It is assumed that STA 2 and STA 4 are delay-sensitive (DS) STAs and STA 1 and STA 3 are delay-tolerant (DT) STAs in the following description. STAs may be classified into DS and DT STAs on the basis of STA capability or traffic pattern/service type or may be predetermined as DS and DT STAs according to device type/class.

An STA may transmit a probe request frame. Here, the probe request frame may include an indication that indicates whether the STA will receive or wants to receive a direct probe response to a probe request on the basis of one or more of a device class/type (DT/DS, sensor/offloading and the like), a traffic pattern/service type (real time traffic such as VoIP/HTTP traffic/streaming) and device capability. Referring to FIG. 21, STA 1 and STA 3 can transmit a probe request frame including an indication (e.g., a DS STA, a sensor STA, an STA transmitting real-time traffic and the like) that requests a direct (or unicast) probe response frame. STA 2 and STA 4 can transmit a probe request frame including an indication (e.g., a DT STA, an offloading STA, an STA transmitting non-real time traffic and the like) indicating that a response is not required (or no response is permitted). FIG. 22 illustrates an exemplary probe response indication information element for the aforementioned indication.

Upon reception of the probe response indication (through a probe response indication field or the like) from the STA, the AP can transmit a probe response frame to the STA that has requested the probe response frame (after acquisition of an idle channel access opportunity). When the probe response indication does not request a direct probe response, the AP can broadcast one probe response frame to STAs (e.g., STA 2 and STA 4 in FIG. 21) related to the probe response indication. More specifically, the AP can determine STAs to which the probe response frame will be broadcast on the basis of a specific interval/timing. Here, the specific interval/timing may be included in an interval corresponding to a predetermined offset from the next TBTT (or immediately previous TBTT). Alternatively, the AP may transmit probe response frames upon reception of all probe request frames of STAs that have requested the probe response frames. When content of probe request frames of STAs receiving one probe response frame differs from content of the probe response frame, the AP may group STAs having the same content and transmit the probe response frame thereto. Alternatively, the AP may allow STAs that do not request direct probe responses to receive the next beacon frame.

FIG. 23 illustrates an example of allowing STAs that do not request direct probe response frames to acquire system information through the next (full) beacon frame. Differently from the example shown in FIG. 23, responses may be transmitted to the STAs that do not request direct probe response frames through a short frame format instead of the (full) beacon frame. Alternatively, a fast initial link setup (FILS) frame may be transmitted prior to the next (full) beacon frame. Accordingly, when an STA receives the aforementioned frame (short frame format, FILS frame and the like), the STA can acquire the system information through the frame. When the STA does not receive the aforementioned frame, the STA can acquire the system information through the next beacon frame.

Device Configuration According to an Embodiment of the Present Invention

Figure 24:
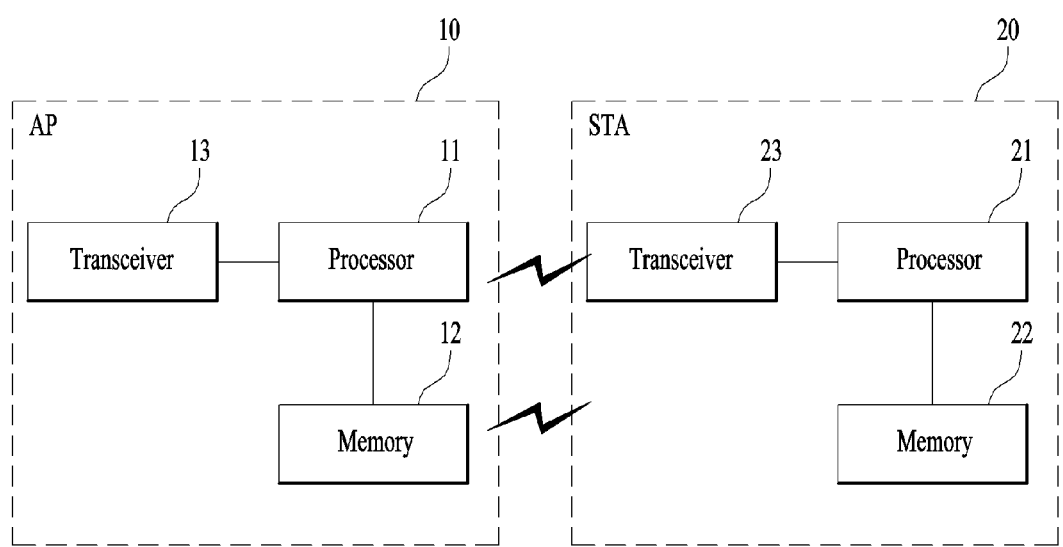
FIG. 24 is a block diagram illustrating a configuration of a wireless apparatus according to an embodiment of the present invention.

FIG. 24 is a block diagram illustrating a configuration of a wireless apparatus according to an embodiment of the present invention.

An AP 10 may include a processor 11, a memory 12 and a transceiver 13. An STA 20 may include a processor 21, a memory 22 and a transceiver 23. The transceivers 13 and 23 can transmit/receive RF signals and implement a physical layer according to IEEE 802, for example. The processors 11 and 21 may be respectively connected to the transceivers 13 and 23 to implement the physical layer and/or MAC layer according to IEEE 802. The processors 11 and 21 may be configured to perform operations according to the aforementioned various embodiments of the present invention. Modules for implementing operations of the AP and the STA according to the aforementioned various embodiments of the present invention may be stored in the memories 12 and 22 and executed by the processors 11 and 21. The memories 12 and 22 may be included in the processors 11 and 21 or provided to the outside of the processors 11 and 21 and connected to the processors 11 and 21 by using a known means.

Configurations of the AP and STA may be implemented such that the aforementioned embodiments of the present invention are independently applied or two or more thereof are simultaneously applied, and description of redundant parts is omitted for clarity.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

INDUSTRIAL APPLICABILITY

While the aforementioned embodiments of the present invention have been described on the basis of IEEE 802.11, the embodiments can be equally applied to various mobile communication systems.

What is claimed is:

1. A method to perform transmission and reception by a station (STA) in a wireless Local Area Network (LAN) system, comprising:
performing clear channel assessment (CCA);
transmitting a request relating to configuration of an uplink interval to an Access Point (AP) when power of an uplink transmission channel is equal to or higher than a first predetermined level is detected as a result of the CCA; and
receiving interval information as a response to the request,
wherein the received interval information is information synchronized with interval information of a basic service set (BSS) relating to the uplink transmission channel when the power of the uplink transmission channel is equal to or higher than the first predetermined level has resulted from the uplink transmission channel,
wherein the received interval information is at least related to one of a restricted access window (RAW) and a transmission opportunity (TXOP) time duration, and
wherein the channel access of the STA is prohibited in the uplink interval corresponding to the received interval information when power of a downlink transmission channel is equal to or higher than a second predetermined level has resulted from the downlink transmission channel.

2. The method according to claim 1, wherein a link direction of the received interval information is the same as a link direction of the interval information of the BSS relating to the uplink transmission channel.

3. The method according to claim 1, wherein the STA performs transmission or reception in a slot corresponding to an association identifier (AID) thereof in a link direction corresponding to the RAW including the slot.

4. The method according to claim 1, wherein the interval information is transmitted through a beacon frame.

5. The method according to claim 1, wherein the STA performs transmission or reception in the TXOP time duration in a link direction set in the TXOP time duration.

6. The method according to claim 1, wherein information about the TXOP truncation is transmitted to an AP of the BSS relating to the uplink transmission when TXOP truncation is applied to the TXOP time duration.

7. The method according to claim 6, further comprising receiving a ready to send (RTS) frame transmitted from an STA relating to the uplink transmission channel,
wherein, when the STA does not receive a clear to send (CTS) frame within a predetermined time after receiving the RTS frame, the STA is determined to be located outside the coverage of the AP of the BSS relating to the uplink transmission channel.

8. The method according to claim 1, wherein the STA is located outside the coverage of the AP of the BSS relating to the uplink transmission when a BSS to which the STA belongs includes the coverage of the AP of the BSS relating to the uplink transmission channel.

9. The method according to claim 1, wherein the request relating to configuration of an interval includes a request for a beam pattern different from a beam pattern used in the BSS relating to the uplink transmission channel.

10. The method according to claim 1, further comprising transmitting a probe request frame to the AP,
wherein the probe request frame includes an indication indicating whether a direct probe response to the probe request frame is received.

11. The method according to claim 10, wherein the indication is determined on the basis of whether the STA is a delay-tolerant (DT) STA or a delay-sensitive (DS) STA.

12. A station (STA) in a wireless Local Area Network (LAN) system, comprising:
a transceiver module; and
a processor,
wherein the processor is configured to:
perform Clear Channel Assessment (CCA),
transmit a request relating to configuration of an uplink interval to an Access Point when power of an uplink transmission channel is equal to or higher than a first predetermined level is detected as a result of the CCA and to receive interval information as a response to the request,
wherein the received interval information is information synchronized with interval information of a basic service set (BSS) relating to the uplink transmission channel when the power of the uplink transmission channel is equal to or higher than the first predetermined level has resulted from the uplink transmission channel, wherein the received interval information is at least related to one of a restricted access window (RAW) and a transmission opportunity (TXOP) time duration, and wherein the channel access of the STA is prohibited in the uplink interval corresponding to the received interval information when power of a downlink transmission channel is equal to or higher than a second predetermined level has resulted from the downlink transmission channel.

* * * * *